US010542429B2

(12) United States Patent
Kawakita et al.

(10) Patent No.: US 10,542,429 B2
(45) Date of Patent: Jan. 21, 2020

(54) COMMUNICATION TERMINAL IDENTIFICATION INFORMATION IDENTIFYING PROCESSING SYSTEM

(71) Applicant: ALLIED TELESIS HOLDINGS K.K., Tokyo (JP)

(72) Inventors: Jun Kawakita, Tokyo (JP); Takayuki Sato, Tokyo (JP)

(73) Assignee: ALLIED TELESIS HOLDINGS K.K., Tokyo (JP)

( * ) Notice: Subject to any disclaimer, the term of this patent is extended or adjusted under 35 U.S.C. 154(b) by 151 days.

(21) Appl. No.: 15/127,220

(22) PCT Filed: Apr. 13, 2016

(86) PCT No.: PCT/JP2016/061868
§ 371 (c)(1),
(2) Date: Sep. 19, 2016

(87) PCT Pub. No.: WO2017/179143
PCT Pub. Date: Oct. 19, 2017

(65) Prior Publication Data
US 2018/0109944 A1 Apr. 19, 2018

(51) Int. Cl.
*H04L 29/06* (2006.01)
*H04W 12/06* (2009.01)
(Continued)

(52) U.S. Cl.
CPC ............ *H04W 12/06* (2013.01); *G06F 21/35* (2013.01); *H04L 63/0861* (2013.01);
(Continued)

(58) Field of Classification Search
CPC ............ G06K 9/00342; G06K 9/00771; G06T 2207/30232; G06T 7/20; G08B 13/19613;
(Continued)

(56) References Cited

U.S. PATENT DOCUMENTS 9,554,279 B1 * 1/2017 Kremer ................. H04W 12/08
2010/0311347 A1 * 12/2010 Le Thierry D'Ennequin ..............
H04N 1/32106
455/67.11
(Continued)

FOREIGN PATENT DOCUMENTS

JP 2002147080 A 5/2002
JP 2007257122 A 10/2007
(Continued)

OTHER PUBLICATIONS

International Search Report for serial No. PCT/JP2016/061868 dated Jul. 5, 2016.

Primary Examiner — Edward Zee
Assistant Examiner — Ka Shan Choy
(74) Attorney, Agent, or Firm — Brooks Acordia IP Law, PC; Michael Zarrabian

(57) ABSTRACT

A communication terminal identification information identifying processing system includes a person recognition processing unit that performs person recognition processing based on image information obtained by capturing a wireless LAN communication spot by a capturing device, a communication terminal identification information acquisition processing unit that acquires communication terminal identification information, a communication terminal identification information storage unit that stores, for each person, candidate communication terminal identification information of the portable communication terminal used by the person, a communication terminal identification information comparison processing unit that compares the candidate communication terminal identification information of the portable communication terminal stored in the communication terminal identification information storage unit and the communication terminal identification information acquired in the communication terminal identification information (Continued)

acquisition processing unit, and generates new candidate communication terminal identification information, and an output processing unit that outputs a part or all of the candidate communication terminal identification information.

7 Claims, 12 Drawing Sheets

(51) Int. Cl.
    *H04W 12/08*     (2009.01)
    *H04W 84/12*     (2009.01)
    *H04W 76/10*     (2018.01)
    *G06F 21/35*     (2013.01)

(52) U.S. Cl.
    CPC ......... *H04L 63/0876* (2013.01); *H04W 12/08* (2013.01); *H04W 76/10* (2018.02); *H04W 84/12* (2013.01)

(58) Field of Classification Search
    CPC ..... H04N 5/2258; H04N 7/181; H04W 8/005; H04W 12/06; H04W 12/08; H04W 76/107; G06F 21/35; G06F 21/31; G06F 21/32; H04L 63/0861; H04L 63/0876
    See application file for complete search history.

(56) References Cited

U.S. PATENT DOCUMENTS

| | | | |
|---|---|---|---|
| 2012/0235790 A1* | 9/2012 | Zhao | G06F 21/32 340/5.83 |
| 2013/0190018 A1* | 7/2013 | Mathews | H04W 4/023 455/456.6 |
| 2014/0355592 A1* | 12/2014 | Camps | H04W 4/023 370/338 |
| 2015/0085111 A1* | 3/2015 | Lavery | H04N 21/21805 348/143 |
| 2015/0319730 A1* | 11/2015 | Seine | H04W 64/003 370/338 |
| 2015/0341599 A1* | 11/2015 | Carey | H04N 7/181 348/150 |

FOREIGN PATENT DOCUMENTS

| | | |
|---|---|---|
| JP | 2009284442 A | 12/2009 |
| JP | 2015194930 A | 5/2015 |
| JP | 2015-211298 A | 11/2015 |

* cited by examiner

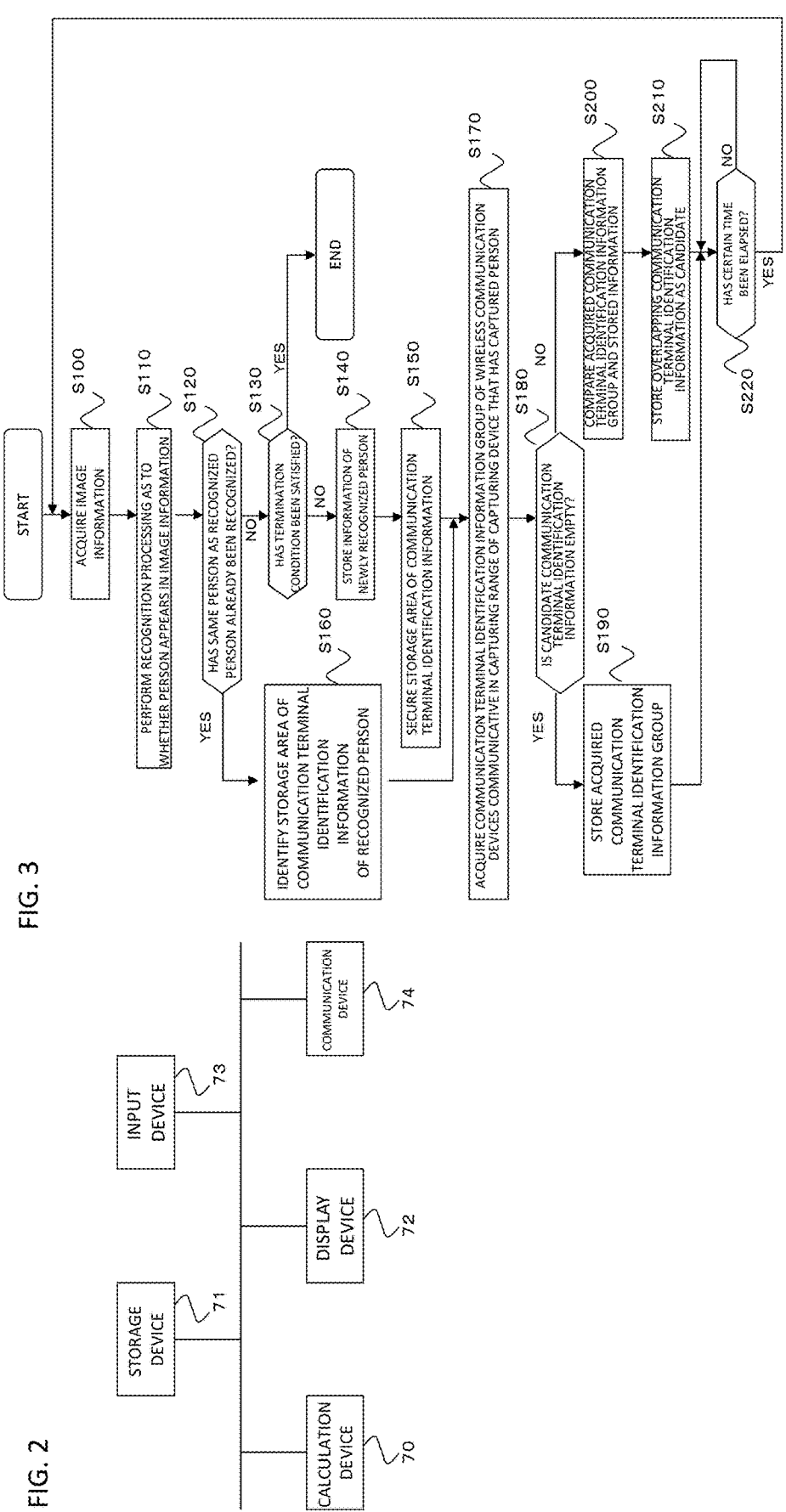

FIG. 5

USER a

| PERSON ID | ACCESS POINT | DATE AND TIME | COMMUNICATION TERMINAL IDENTIFICATION INFORMATION |
|---|---|---|---|
| 12345 | AREA 1 | 2016/1/20 10:01:10 | 12-34-56-78-90-12 |
| | | 2016/1/20 10:01:20 | 34-56-78-90-12-34 |
| | | 2016/1/20 10:02:30 | 56-78-90-12-34-56 |
| | | 2016/1/20 10:02:40 | 78-90-12-34-56-78 |

USER b

| PERSON ID | ACCESS POINT | DATE AND TIME | COMMUNICATION TERMINAL IDENTIFICATION INFORMATION |
|---|---|---|---|
| 67890 | AREA 1 | 2016/1/20 10:01:10 | 12-34-56-78-90-12 |
| | | 2016/1/20 10:01:20 | 34-56-78-90-12-34 |
| | | 2016/1/20 10:02:30 | 56-78-90-12-34-56 |
| | | 2016/1/20 10:02:40 | 78-90-12-34-56-78 |

USER c

| PERSON ID | ACCESS POINT | DATE AND TIME | COMMUNICATION TERMINAL IDENTIFICATION INFORMATION |
|---|---|---|---|
| 24680 | AREA 1 | 2016/1/20 10:01:10 | 12-34-56-78-90-12 |
| | | 2016/1/20 10:01:20 | 34-56-78-90-12-34 |
| | | 2016/1/20 10:02:30 | 56-78-90-12-34-56 |
| | | 2016/1/20 10:02:40 | 78-90-12-34-56-78 |

USER d

| PERSON ID | ACCESS POINT | DATE AND TIME | COMMUNICATION TERMINAL IDENTIFICATION INFORMATION |
|---|---|---|---|
| 13579 | AREA 1 | 2016/1/20 10:01:10 | 12-34-56-78-90-12 |
| | | 2016/1/20 10:01:20 | 34-56-78-90-12-34 |
| | | 2016/1/20 10:02:30 | 56-78-90-12-34-56 |
| | | 2016/1/20 10:02:40 | 78-90-12-34-56-78 |

FIG. 6

USER a

| PERSON ID | ACCESS POINT | DATE AND TIME | COMMUNICATION TERMINAL IDENTIFICATION INFORMATION |
|---|---|---|---|
| 12345 | AREA 1 | 2016/1/20 10:15:50 | 12-34-56-78-90-12 |
| | | 2016/1/20 10:16:00 | 34-56-78-90-12-34 |

USER b

| PERSON ID | ACCESS POINT | DATE AND TIME | COMMUNICATION TERMINAL IDENTIFICATION INFORMATION |
|---|---|---|---|
| 67890 | AREA 1 | 2016/1/20 10:15:50 | 12-34-56-78-90-12 |
| | | 2016/1/20 10:16:00 | 34-56-78-90-12-34 |

USER e

| PERSON ID | ACCESS POINT | DATE AND TIME | COMMUNICATION TERMINAL IDENTIFICATION INFORMATION |
|---|---|---|---|
| 54321 | AREA 1 | 2016/1/20 10:15:50 | 12-34-56-78-90-12 |
| | | 2016/1/20 10:16:00 | 34-56-78-90-12-34 |
| | | 2016/1/20 10:16:10 | 90-12-34-56-78-90 |
| | | 2016/1/20 10:16:30 | 12-AB-34-CD-56-EF |

USER f

| PERSON ID | ACCESS POINT | DATE AND TIME | COMMUNICATION TERMINAL IDENTIFICATION INFORMATION |
|---|---|---|---|
| 98765 | AREA 1 | 2016/1/20 10:15:50 | 12-34-56-78-90-12 |
| | | 2016/1/20 10:16:00 | 34-56-78-90-12-34 |
| | | 2016/1/20 10:16:10 | 90-12-34-56-78-90 |
| | | 2016/1/20 10:16:30 | 12-AB-34-CD-56-EF |

FIG. 7

USER a

| PERSON ID | ACCESS POINT | DATE AND TIME | COMMUNICATION TERMINAL IDENTIFICATION INFORMATION |
|---|---|---|---|
| 12345 | AREA 1 | 2016/1/20 10:26:50 | 12-34-56-78-90-12 |

USER e

| PERSON ID | ACCESS POINT | DATE AND TIME | COMMUNICATION TERMINAL IDENTIFICATION INFORMATION |
|---|---|---|---|
| 54321 | AREA 1 | 2016/1/20 10:26:50 | 12-34-56-78-90-12 |
|  |  | 2016/1/20 10:27:00 | 90-12-34-56-78-90 |
|  |  | 2016/1/20 10:28:10 | 12-AB-34-CD-56-EF |

USER f

| PERSON ID | ACCESS POINT | DATE AND TIME | COMMUNICATION TERMINAL IDENTIFICATION INFORMATION |
|---|---|---|---|
| 98765 | AREA 1 | 2016/1/20 10:26:50 | 12-34-56-78-90-12 |
|  |  | 2016/1/20 10:27:00 | 90-12-34-56-78-90 |
|  |  | 2016/1/20 10:28:10 | 12-AB-34-CD-56-EF |

USER g

| PERSON ID | ACCESS POINT | DATE AND TIME | COMMUNICATION TERMINAL IDENTIFICATION INFORMATION |
|---|---|---|---|
| 35791 | AREA 1 | 2016/1/20 10:26:50 | 12-34-56-78-90-12 |
|  |  | 2016/1/20 10:27:00 | 90-12-34-56-78-90 |
|  |  | 2016/1/20 10:28:10 | 12-AB-34-CD-56-EF |
|  |  | 2016/1/20 10:29:20 | 34-GH-56-1J-78-KL |

FIG. 9

USER a

| PERSON ID | ACCESS POINT | DATE AND TIME | COMMUNICATION TERMINAL IDENTIFICATION INFORMATION |
|---|---|---|---|
| 12345 | AREA 2 | 2016/1/20 10:15:50 | 12-34-56-78-90-12 |
|  |  | 2016/1/20 10:16:00 | 34-56-78-90-12-34 |

USER b

| PERSON ID | ACCESS POINT | DATE AND TIME | COMMUNICATION TERMINAL IDENTIFICATION INFORMATION |
|---|---|---|---|
| 67890 | AREA 2 | 2016/1/20 10:15:50 | 12-34-56-78-90-12 |
|  |  | 2016/1/20 10:16:00 | 34-56-78-90-12-34 |

USER e

| PERSON ID | ACCESS POINT | DATE AND TIME | COMMUNICATION TERMINAL IDENTIFICATION INFORMATION |
|---|---|---|---|
| 54321 | AREA 2 | 2016/1/20 10:15:50 | 12-34-56-78-90-12 |
|  |  | 2016/1/20 10:16:00 | 34-56-78-90-12-34 |
|  |  | 2016/1/20 10:16:10 | 90-12-34-56-78-90 |
|  |  | 2016/1/20 10:16:30 | 12-AB-34-CD-56-EF |

USER f

| PERSON ID | ACCESS POINT | DATE AND TIME | COMMUNICATION TERMINAL IDENTIFICATION INFORMATION |
|---|---|---|---|
| 98765 | AREA 2 | 2016/1/20 10:15:50 | 12-34-56-78-90-12 |
|  |  | 2016/1/20 10:16:00 | 34-56-78-90-12-34 |
|  |  | 2016/1/20 10:16:10 | 90-12-34-56-78-90 |
|  |  | 2016/1/20 10:16:30 | 12-AB-34-CD-56-EF |

FIG. 10

USER a

| PERSON ID | ACCESS POINT | DATE AND TIME | COMMUNICATION TERMINAL IDENTIFICATION INFORMATION |
|---|---|---|---|
| 12345 | AREA 3 | 2016/1/20 10:26:50 | 12-34-56-78-90-12 |

USER e

| PERSON ID | ACCESS POINT | DATE AND TIME | COMMUNICATION TERMINAL IDENTIFICATION INFORMATION |
|---|---|---|---|
| 54321 | AREA 3 | 2016/1/20 10:26:50 | 12-34-56-78-90-12 |
| | | 2016/1/20 10:27:00 | 90-12-34-56-78-90 |
| | | 2016/1/20 10:28:10 | 12-AB-34-CD-56-EF |

USER f

| PERSON ID | ACCESS POINT | DATE AND TIME | COMMUNICATION TERMINAL IDENTIFICATION INFORMATION |
|---|---|---|---|
| 98765 | AREA 3 | 2016/1/20 10:26:50 | 12-34-56-78-90-12 |
| | | 2016/1/20 10:27:00 | 90-12-34-56-78-90 |
| | | 2016/1/20 10:28:10 | 12-AB-34-CD-56-EF |

USER g

| PERSON ID | ACCESS POINT | DATE AND TIME | COMMUNICATION TERMINAL IDENTIFICATION INFORMATION |
|---|---|---|---|
| 35791 | AREA 3 | 2016/1/20 10:26:50 | 12-34-56-78-90-12 |
| | | 2016/1/20 10:27:00 | 90-12-34-56-78-90 |
| | | 2016/1/20 10:28:10 | 12-AB-34-CD-56-EF |
| | | 2016/1/20 10:29:20 | 34-GH-56-IJ-78-KL |

FIG. 14

USER a

| PERSON ID | ACCESS POINT | DATE AND TIME | COMMUNICATION TERMINAL IDENTIFICATION INFORMATION | RELIABILITY INFORMATION |
|---|---|---|---|---|
| 12345 | AREA 1 | 2016/1/20 10:01:10 | 12-34-56-78-90-12 | 0 |
| | | 2016/1/20 10:01:20 | 34-56-78-90-12-34 | 0 |
| | | 2016/1/20 10:02:30 | 56-78-90-12-34-56 | 0 |
| | | 2016/1/20 10:02:40 | 78-90-12-34-56-78 | 0 |

FIG. 15

USER a

| PERSON ID | ACCESS POINT | DATE AND TIME | COMMUNICATION TERMINAL IDENTIFICATION INFORMATION | RELIABILITY INFORMATION |
|---|---|---|---|---|
| 12345 | AREA 1 | 2016/1/20 10:01:10 | 12-34-56-78-90-12 | 1 |
| | | 2016/1/20 10:01:20 | 34-56-78-90-12-34 | 1 |
| | | 2016/1/20 10:02:30 | 56-78-90-12-34-56 | 0 |
| | | 2016/1/20 10:02:40 | 78-90-12-34-56-78 | 0 |
| | AREA 2 | 2016/1/20 10:16:10 | 90-12-34-56-78-90 | 0 |
| | | 2016/1/20 10:16:30 | 12-AB-34-CD-56-EF | 0 |

FIG. 16

USER a

| PERSON ID | ACCESS POINT | DATE AND TIME | COMMUNICATION TERMINAL IDENTIFICATION INFORMATION | RELIABILITY INFORMATION |
|---|---|---|---|---|
| 12345 | AREA 1 | 2016/1/20 10:01:10 | 12-34-56-78-90-12 | 2 |
| | | 2016/1/20 10:01:20 | 34-56-78-90-12-34 | 1 |
| | | 2016/1/20 10:02:30 | 56-78-90-12-34-56 | 0 |
| | | 2016/1/20 10:02:40 | 78-90-12-34-56-78 | 0 |
| | AREA 2 | 2016/1/20 10:16:10 | 90-12-34-56-78-90 | 1 |
| | | 2016/1/20 10:16:30 | 12-AB-34-CD-56-EF | 1 |
| | AREA 3 | 2016/1/20 10:29:20 | 34-GH-56-IJ-78-KL | 0 |

COMMUNICATION TERMINAL IDENTIFICATION INFORMATION IDENTIFYING PROCESSING SYSTEM

TECHNICAL FIELD

The present invention relates to a communication terminal identification information identifying processing system that identifies communication terminal identification information of a portable communication terminal used by a user when the user uses communication through an access point.

BACKGROUND ART

In recent years, access points of public wireless LANs have been put in place. In a case of accessing a network outside home, use of a wireless LAN function of a portable communication terminal has been increased. Accordingly, wireless communication is performed between an access point or a wireless LAN switch (wireless LAN master device) installed in a wireless LAN communication spot and the portable communication terminal (extension device), and an access to the Internet through the wireless LAN communication spot becomes available.

When the wireless communication is performed between the access point or the wireless LAN switch installed in the wireless LAN communication spot, and the portable communication terminal, the portable communication terminal is identified with communication terminal identification information such as a MAC address, and the wireless communication is performed. Therefore, in the wireless LAN communication spot, the portable communication terminal that is performing the wireless communication is managed with the communication terminal identification information. Patent Literature 1 describes an example of the wireless communication using the wireless LAN.

CITATION LIST

Patent Literature

Patent Literature 1: JP 2015-211298 A

SUMMARY OF INVENTION

Technical Problem

In the access to the Internet through the wireless LAN communication spot, like Patent Literature 1, the portable communication terminal can be identified only with the communication terminal identification information in the access point or the wireless LAN switch, and who is actually using the wireless communication can be identified only after an input of a user ID or the like is accepted when the wire LAN is used. Although personal information can be identified by making an inquiry to a communication provider, in general, the communication provider does not disclose who is using the communication terminal identification information to a third person from the perspective of privacy of communication, protection of personal information, and the like.

For example, when a person, who is registered to be at a high risk for criminal wrongdoing, uses the Internet through the wireless LAN to conduct a criminal act, for example, immediate interruption of the communication and prevention of the criminal act are required. However, conventionally, only the communication terminal identification information can be obtained in the access point or the wireless LAN switch, and thus whether the person who is using the wireless LAN communication spot is the person at a high risk for criminal wrongdoing cannot be inherently identified. Therefore, interruption or interception of the communication cannot be made.

Therefore, a system to promptly identify the communication terminal identification information when a person registered in advance is using the public wireless LAN in the wireless LAN communication spot is desired.

Solution to Problem

In view of the foregoing, the present inventors have invented a communication terminal identification information identifying processing system that identifies communication terminal identification information of a user of a portable communication terminal that is performing communication through a wireless LAN in a wireless LAN communication spot.

A first invention is a communication terminal identification information identifying processing system for identifying communication terminal identification information of a user who performs communication with a portable communication terminal using a wireless communication device, the communication terminal identification information identifying processing system including: a person recognition processing unit configured to perform recognition processing as to whether a person appears, based on image information obtained by capturing a wireless LAN communication spot where the wireless communication device exists by a capturing device; a communication terminal identification information acquisition processing unit configured to acquire communication terminal identification information of the portable communication terminal that performs communication using the wireless communication device; a communication terminal identification information storage unit configured to store, for each person, candidate communication terminal identification information of the portable communication terminal used by the person; a communication terminal identification information comparison processing unit configured to compare the candidate communication terminal identification information of the portable communication terminal stored in the communication terminal identification information storage unit, of the person recognized in the person recognition processing unit, and the communication terminal identification information acquired in the communication terminal identification information acquisition processing unit, and generate new candidate communication terminal identification information; and an output processing unit configured to output a part or all of the candidate communication terminal identification information stored in the communication terminal identification information storage unit as the communication terminal identification information used by the recognized person.

With such a configuration of the present invention, the communication terminal identification information of the portable communication terminal of the user who is using the wireless LAN communication spot can be narrowed down. Therefore, interruption or interception of the communication between the wireless communication device such as the access point or the wireless LAN switch and the portable communication terminal becomes possible based on the narrowed-down communication terminal identification information. Further, in some cases, false information can be distributed. Further, an act to activate a detonator of explosives through the network can be stopped. As described above, intervention in some sort of act through the network through the wireless LAN communication spot can be made. Accordingly, an investigating authority or the like can minimally intervene in the communication without unnecessarily violating the privacy of communication, and can give consideration to privacy.

The above invention may be configured as the communication terminal identification information identifying processing system, wherein the wireless communication device monitors received radio wave intensity in the communication with the portable communication terminal, a plurality of the wireless communication devices is installed in the wireless LAN communication spot, and a direction and/or a distance of the portable communication terminal is identified by an overlap of existing ranges of the portable communication terminal, the existing ranges being formed based on the received radio wave intensity of the wireless communication devices.

With such a configuration of the present invention, the direction and the distance of the portable communication terminal are identified, and thus accuracy of narrowing-down can be improved.

The above invention may be configured as the communication terminal identification information identifying processing system, wherein the communication terminal identification information storage unit stores reliability information that indicates reliability in association with the candidate communication terminal identification information, the communication terminal identification information comparison processing unit sets a union set of the candidate communication terminal identification information of the portable communication terminal stored in the communication terminal identification information storage unit and the communication terminal identification information acquired in the communication terminal identification information acquisition processing unit to new candidate communication terminal identification information, and changes the reliability information of the communication terminal identification information included in and/or not included in a product set, at the comparison, and the output processing unit identifies the communication terminal identification information to be output, based on the reliability information.

With such a configuration of the present invention, the narrowing-down can be performed based on the reliability information of the candidate communication terminal identification information.

The above invention may be configured as the communication terminal identification information identifying processing system, wherein the communication terminal identification information comparison processing unit changes the reliability information using the direction and/or the distance of the portable communication terminal identified in the wireless communication device.

With such a configuration of the present invention, accuracy of the reliability information can be further improved.

The communication terminal identification information identifying processing system in the first invention can be achieved by causing a computer to read a program of the present invention. That is, the program is a communication terminal identification information identifying processing program for causing a computer used in a communication terminal identification information identifying processing system for identifying communication terminal identification information of a user who performs communication with a portable communication terminal using a wireless communication device to function as: a person recognition processing unit configured to perform recognition processing as to whether a person appears, based on image information obtained by capturing a wireless LAN communication spot where the wireless communication device exists by a capturing device; a communication terminal identification information acquisition processing unit configured to acquire communication terminal identification information of the portable communication terminal that performs communication using the wireless communication device; a communication terminal identification information comparison processing unit configured to compare, for each person recognized in the person recognition processing unit, candidate communication terminal identification information of the portable communication terminal of the person recognized in the person recognition processing unit, the candidate communication terminal identification information being stored in a communication terminal identification information storage unit that stores the candidate communication terminal identification information of the portable communication terminal used by the person, and the communication terminal identification information acquired in the communication terminal identification information acquisition processing unit, and generate new candidate communication terminal identification information; and an output processing unit configured to output a part or all of the candidate communication terminal identification information stored in the communication terminal identification information storage unit as the communication terminal identification information used by the recognized person.

Advantageous Effects of Invention

According to the present invention, the communication terminal identification information can be identified when communication through the wireless LAN in the wireless LAN communication spot is being performed. Accordingly, for example, when a person who is registered in advance as a person at a high risk for criminal wrongdoing is performing communication through the wireless LAN in the wireless LAN communication spot, the communication can be identified. Therefore, intervention in the communication through the wireless LAN communication spot, such as interruption or interception of the communication, distribution of false information, and stop of activation of a detonator of explosives through the network, becomes possible, and can be used for prevention of the criminal wrongdoing.

Further, although the communication terminal identification information can be falsified, usually, the falsification requires a certain operation, and when the person goes out, the person usually uses the same "falsified" communication terminal identification information at least for the day. If so, even if the communication terminal identification information is falsified, intervention in the communication can be made by use of the present invention.

BRIEF DESCRIPTION OF DRAWINGS

FIG. 2 is a diagram schematically illustrating an example of a hardware configuration of a computer used in the communication terminal identification information identifying processing system.

FIG. 3 is a flowchart schematically illustrating an example of a processing process in the communication terminal identification information identifying processing system of the present invention.

FIG. 5 is a diagram schematically illustrating an example of a communication terminal identification information storage unit.

FIG. 6 is a diagram schematically illustrating another example of the communication terminal identification information storage unit.

FIG. 7 is a diagram schematically illustrating another example of the communication terminal identification information storage unit.

FIG. 9 is a diagram schematically illustrating another example of a communication terminal identification information storage unit.

FIG. 10 is a diagram schematically illustrating another example of the communication terminal identification information storage unit.

FIG. 14 is a diagram schematically illustrating an example of a communication terminal identification information storage unit in a seventh embodiment.

FIG. 15 is a diagram schematically illustrating another example of the communication terminal identification information storage unit in the seventh embodiment.

FIG. 16 is a diagram schematically illustrating another example of the communication terminal identification information storage unit in the seventh embodiment.

DESCRIPTION OF EMBODIMENTS

Figure 1:
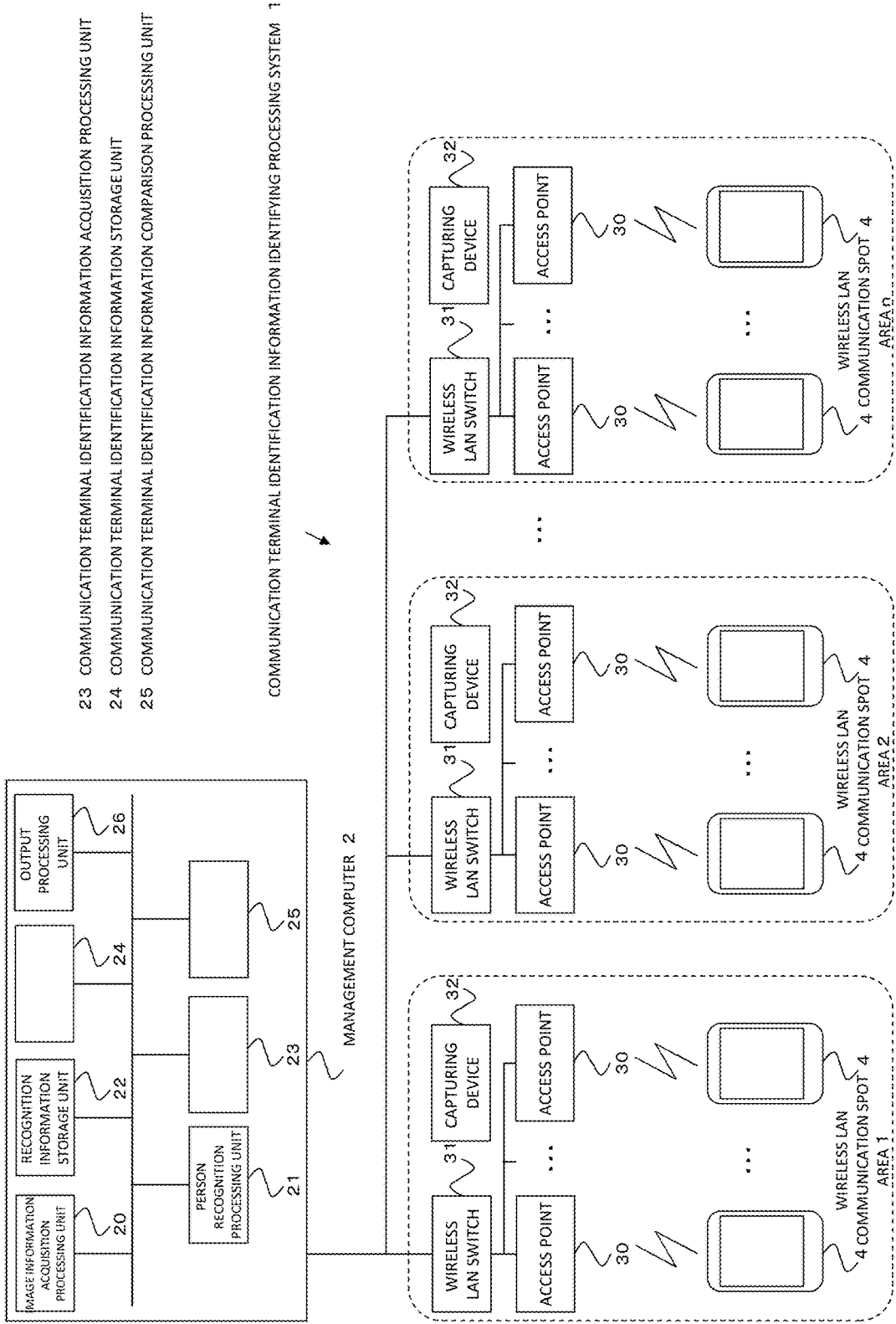
FIG. 1 is a conceptual diagram schematically illustrating an example of an overall configuration of a communication terminal identification information identifying processing system of the present invention.

An example of an overall configuration of a communication terminal identification information identifying processing system 1 of the present invention is schematically illustrated in FIG. 1. The communication terminal identification information identifying processing system 1 includes a management computer 2 used by a company or the like that manages the present system, and communication devices 74 of various types of wireless LANs in wireless LAN communication spots.

The management computer 2 is realized by various types of computers such as a server and a personal computer. FIG. 2 illustrates an example of a hardware configuration of a computer. The computer such as the management computer 2 includes a calculation device 70 such as a CPU that executes calculation processing of a program, a storage device 71 such as a RAM and a hard disk that stores information, a display device 72 such as a display, an input device 73 such as a keyboard and a pointing device (a mouse and numeric keys), and a communication device 74 that transmits/receives a processing result of the calculation device 70 and the information to be stored in the storage device 71 through a network such as the Internet or a LAN.

Note that FIG. 1 illustrates a case in which the management computer 2 is realized by one computer. However, functions of the management computer 2 may be distributed and arranged in a plurality of computers, and realized. Further, functions of means in the present invention are merely logically distinguished, and may form the same region in a physical or real sense.

Functions of processing units and the storage unit in the present invention are logically distinguished, and may form the same region in a physical or real sense. Further, a data file may be employed in place of a database, and the description "database" includes the data file.

The wireless LAN communication spot includes one or two or more access points 30 that perform communication with a portable communication terminal 4 used by a user through a wireless LAN, one or two or more wireless LAN switches 31 that manage the access points 30, and an capturing device 32 that captures the user of the portable communication terminal 4 near the wireless LAN communication spot. Note that it is favorable to provide at least a plurality of the wireless LAN communication spots in arbitrary places. However, the number of the wireless LAN communication spots may be one. FIG. 1 illustrates a case in which the management computer 2 manages a plurality of wireless communication spots.

The access point 30 is a device for the portable communication terminal 4 to perform communication through the wireless LAN in the wireless LAN communication spot, and performs the wireless communication between the access point 30 and the portable communication terminal 4. Further, the access point 30 performs communication with the wireless LAN switch 31 described below by wired or wireless means. That is, the access point 30 is a device that relays communication between the portable communication terminal 4 and the wireless LAN switch 31.

The wireless LAN switch 31 acquires communication terminal identification information for identifying the portable communication terminal 4 such as a MAC address or the user of the portable communication terminal 4 from the portable communication terminal 4 through the access point 30, and manages the communication terminal identification information. The communication terminal identification information may be any information in addition to the MAC address as long as the information identifies the portable communication terminal 4 or the user thereof, and may be a user ID for using the wireless LAN communication spot, for example. Note that, in a case where information that is not directly used for the communication, such as the MAC address, is used as the communication terminal identification information, a relationship between the communication terminal identification information and information that is used for communication with the portable communication terminal 4 is maintained, and the information that is used for communication, such as the MAC address, is identified by reference to the relationship.

Note that, in the wireless LAN communication spot, a configuration to perform communication between the wireless LAN communication spot and the management computer 2 through the wireless LAN switch 31 will be described. However, the access point 30 may have a function equivalent to the wireless LAN switch 31, instead of using the wireless LAN switch 31. In this case, the access point 30 may acquire and hold the communication terminal identification information of the portable communication terminal 4 that is performing communication with the access point 30. In the description of the present invention, the access point 30 relays the communication between the portable communication terminal 4 and the wireless LAN switch 31 even though not explicitly stated. The access point 30 and/or the wireless LAN switch 31 in the wireless LAN communication spot are referred to as wireless communication device.

The capturing device 32 is a device for imaging a person who exists in and/or near a communicative range of the wireless LAN communication spot and is performing communication through the wireless LAN with the portable communication terminal 4. One or two or more capturing devices 32 may be installed in the wireless LAN communication spot. As the capturing device 32, a security camera can be used. In this case, the capturing device 32 acquires image information of a still image or a moving image. Note that the capturing device 32 may be provided with a sound collecting device (microphone), and may acquire sound information.

When the capturing device 32 sends the captured image information to the management computer 2 described below, the image information may be sent from the capturing device 32, or may be sent through the wireless LAN switch 31.

Note that, in a case of using the capturing device 32, capturing the face from the front to the extent possible improves accuracy of recognition. Therefore, it is favorable to install the capturing device 32 in a position where the capturing device 32 can capture the user near from the front. For example, it is favorable to install the capturing device 32 near the front of transportation means such as a bus or a train, a doorway of a facility, or a security gate described below.

First Embodiment

As a first embodiment of the present invention, a case where image information acquired by a capturing device 32 is sent to a management computer 2, and the management computer 2 executes processing of recognizing whether a person appears in the image information will be described. Therefore, the image information captured by the capturing device 32 and communication terminal identification information acquired by a wireless LAN switch 31 are sent to the management computer 2.

The management computer 2 includes an image information acquisition processing unit 20, a person recognition processing unit 21, a recognition information storage unit 22, a communication terminal identification information acquisition processing unit 23, a communication terminal identification information storage unit 24, a communication terminal identification information comparison processing unit 25, and an output processing unit 26.

The image information acquisition processing unit 20 acquires the captured image information from the capturing device 32 or the wireless LAN switch 31 in the wireless LAN communication spot.

The person recognition processing unit 21 recognizes whether a person is included from the image information acquired in the image information acquisition processing unit 20. As the processing of recognizing a person from image information, known face authentication processing technologies can be used. However, other recognition processing technologies may be used. The person recognition processing unit 21 allocates, to a person who is newly recognized, identification information (person ID) for identifying the person. When the person recognition processing unit 21 recognizes a plurality of persons, the person recognition processing unit 21 executes the processing for each recognized person.

The recognition information storage unit 22 stores the image information of the person recognized by the person recognition processing unit 21 (for example, image information of a face portion of the recognized person), the person ID, date and time information of the recognition, information that indicates which wireless LAN communication spot where the person has been recognized, and the like.

The communication terminal identification information acquisition processing unit 23 acquires the communication terminal identification information received from the portable communication terminal 4, from the wireless communication device such as the access point 30 or the wireless LAN switch 31 in the wireless LAN communication spot. At this time, to identify from which access point 30 or the wireless LAN switch 31 the information has been acquired, it is favorable to acquire identification information of the access point 30 or the wireless LAN switch 31, and identification information of the wireless LAN communication spot where the access point 30 or the wireless LAN switch 31 is installed. Further, the communication terminal identification information acquisition processing unit 23 also acquires date and time information of when the communication terminal identification information has been acquired.

Note that the communication terminal identification information acquisition processing unit 23 may just acquire the communication terminal identification information periodically or randomly.

The communication terminal identification information storage unit 24 stores candidate communication terminal identification information of the portable communication terminal 4 used by the recognized person. The candidate communication terminal identification information is managed for each recognized person. FIG. 5 schematically illustrates an example of the communication terminal identification information storage unit 24.

The communication terminal identification information comparison processing unit 25 narrows down the candidate communication terminal identification information by comparing a communication terminal identification information group acquired in the communication terminal identification information acquisition processing unit 23 and the communication terminal identification information already stored in the communication terminal identification information storage unit 24.

The output processing unit 26 outputs the candidate communication terminal identification information of the recognized person, which is stored in the communication terminal identification information storage unit 24 at that time, to the display device 72 of a predetermined computer and the like, at a stage where a predetermined termination condition is satisfied. Note that the output processing unit 26 may output the communication terminal identification information in a printing device or may output a notification to a predetermined destination with an electronic mail or in a message system, in addition to the display device 72. Further, the output processing unit 26 may notify a predetermined destination of an investigating authority.

Examples of the termination condition in the output processing unit 26 include a condition that the recognized person becomes unable to be detected in the image information captured by the capturing device 32, and a condition that the number of the candidate communication terminal identification information (the communication terminal identification information in a storage area of the person in the communication terminal identification information storage unit 24) becomes one. Further, another condition may be set.

Figure 4:
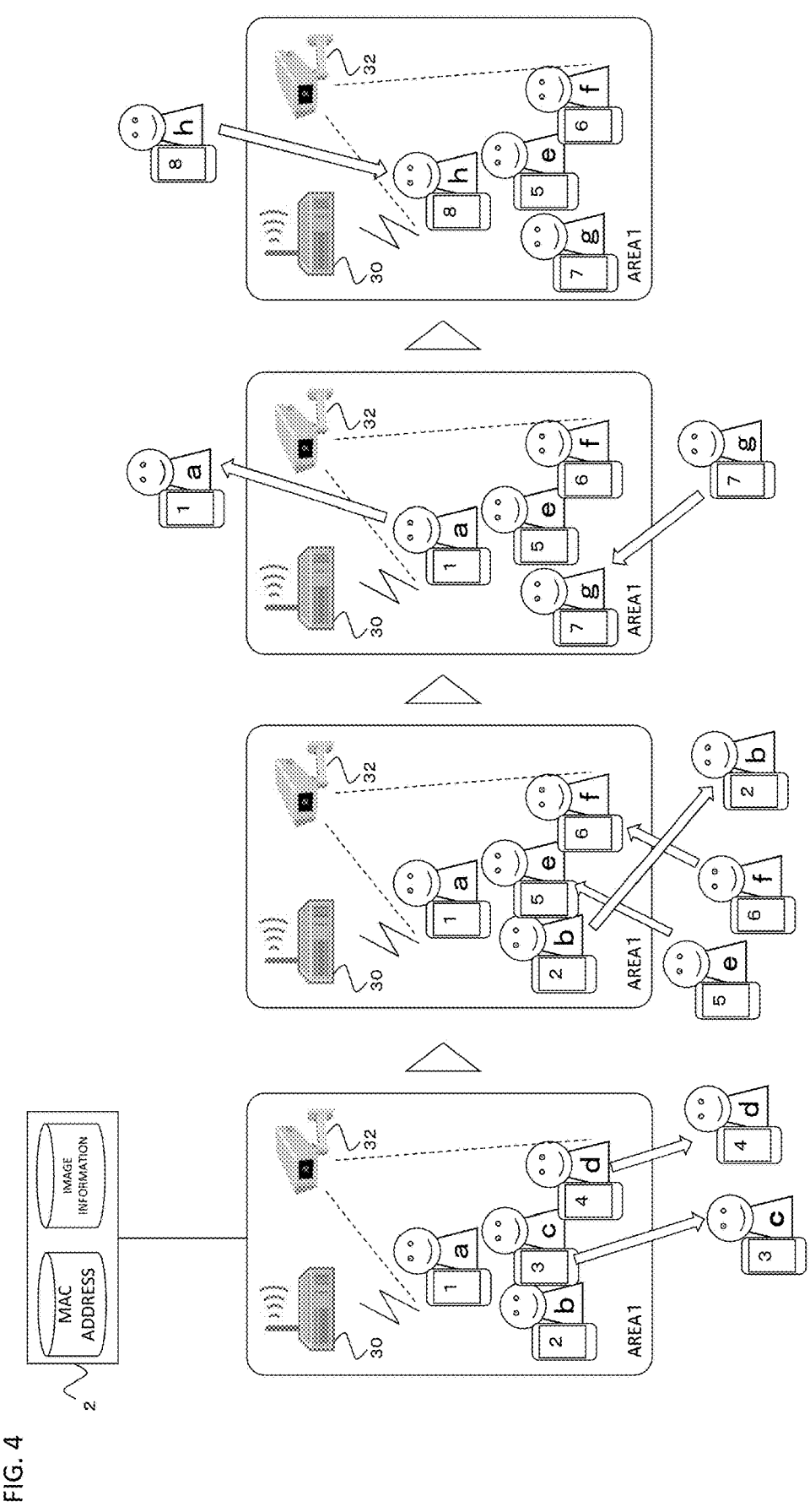
FIG. 4 is a conceptual diagram schematically illustrating a concept of processing in a first embodiment.

Next, an example of a processing process in the present embodiment will be described using the flowchart of FIG. 3. Further, a moving state of users is illustrated in FIG. 4. The present embodiment illustrates a case in which the wireless LAN communication spot is installed in one place in a certain event site and a security camera is used as the capturing device 32, and the image information obtained by capturing a part or the whole of the communicative range of the wireless LAN communication spot by the security camera is used. Note that similar processing can be executed even in a case of a plurality of event sites.

In the present embodiment, an area 1 is provided as the wireless LAN communication spot, and the access point 30, the wireless LAN switch 31, and the security camera are installed in the area 1. Then, the members of persons existing in the area 1 vary over time. That is, a case is illustrated, in which there are four persons (users "a" to "d") in the area 1 at a certain point of time, there are four persons (the users "a", "b", "e", and "f") after a lapse of a predetermined time from the certain point of time, and there are four persons (the users "a", "e", "f", and "g") after a lapse of a predetermined time from the second point of time. That is, the members of users initially existing in the area 1 are changed from the four users "a" to "d" to the four users "a", "b", "e", and "f" (the users "c" and "d" have gone from the area 1 and the users "e" and "f" have entered the area 1), and then to the four users "a", "e", "f", and "g" (the user "b" has gone from the area 1 and the user "g" has entered the area 1).

Further, in the area 1, MAC addresses are recorded in the wireless LAN switches 31 at the respective points of time, and the security camera captures images. Then, the MAC addresses and the image information are sent to the management computer 2.

First, when a user is positioned in a communicative range of the access point 30 of the area 1 that is the wireless LAN communication spot, communication between the portable communication terminal 4 used by the user and the wireless LAN switch 31 is established, and the MAC address of the portable communication terminal 4 is sent to the wireless LAN switch 31 through the access point 30. The wireless LAN switch 31 stores the received MAC address together with information that identifies the wireless LAN communication spot, date and time information, and the like.

The security camera in the area 1 captures a capturing range as a moving image or a still image. The image information captured by the security camera is transmitted to the management computer 2 together with information that identifies the wireless LAN communication spot and the capturing device 32, date and time information of the capturing, and the like. The sent image information is acquired in the image information acquisition processing unit 20 of the management computer 2 (S100).

The person recognition processing unit 21 of the management computer 2 executes the processing of recognizing whether a person appears in the acquired image information (S110). Then, when having recognized that a person appears, the person recognition processing unit 21 determines whether the person is a person having appeared in the past, by comparing the image information with information of persons recognized in the past, which has been stored in the recognition information storage unit 22 (S120). After the processing in the person recognition processing unit 21, the output processing unit 26 determines whether the termination condition, for example, a condition that a person who has been targeted becomes unable to be recognized, or a condition that the number of candidate communication terminal identification information of the person becomes one, has been satisfied (S130). When the output processing unit 26 determines that the termination condition has been satisfied, the output processing unit 26 outputs the communication terminal identification information in the storage region of the person, which is stored in the communication terminal identification information storage unit 24. Meanwhile, when the termination condition is not satisfied, processing of S140 and subsequent steps is continued.

If a new person is recognized, arbitrary identification information (a person ID) is allocated to the person, and information of a face image, the person ID, date and time information of the recognition, information that indicates that the person has been recognized in the area 1, and the like are stored in the recognition information storage unit 22 (S140).

Meanwhile, as a result of the comparison with the recognition information storage unit 22, when the person has already been recognized, the person is identified.

For example, in the case of FIG. 4, at the initial point of time, the person recognition processing unit 21 recognizes that the four persons of the users "a", "b", "c", and "d" appear in the image information. When these four persons are collated with the recognition information storage unit 22 and whether these four persons are persons recognized in the past is determined, all of the four persons are determined to be new. Therefore, the person IDs are respectively allocated to the users "a" to "d", and various types of information including the person IDs, the image information of face portions, the wireless LAN communication spot where the persons have been recognized, and the recognition date and time are stored in the recognition information storage unit 22, as these four persons are newly recognized persons.

Then, since the four persons of the users "a", "b", "c" and "d" are newly recognized, the person recognition processing unit 21 secures storage areas for storing the candidate communication terminal identification information of the communication terminal identification information of the portable communication terminals 4 used by these four persons, in the communication terminal identification information storage unit 24 (S150).

Then, the communication terminal identification information acquisition processing unit 23 acquires the MAC addresses and the date and time information stored in the wireless LAN switch 31 in the wireless LAN communication spot, based on the information that identifies the wireless LAN communication spot corresponding to the image information from which the persons have been recognized (S170). In FIG. 4, in the area 1, the users "a" to "d" respectively use the first to fourth portable communication terminals 4, and the MAC addresses "12-34-56-78-90-12", "34-56-78-90-12-34", "56-78-90-12-34-56", and "78-90-12-34-56-78" of the respective portable communication terminals 4 have been sent to the wireless LAN switch 31 together with "area 1" that indicates the wireless LAN communication spot, and the date and time information. Therefore, the communication terminal identification information acquisition processing unit 23 acquires these pieces of information.

If the storage areas of the candidate communication terminal identification information in the communication terminal identification information storage unit 24 are empty (that is, when persons are newly recognized) (S180), the MAC addresses and the date and time information acquired in S170 are stored in the storage areas as the candidate communication terminal identification information (S190). That is, the acquired MAC addresses and date and time information are respectively stored in the communication terminal identification information storage unit 24, as the candidate communication terminal identification information of the users "a" to "d". An example of the candidate communication terminal identification information stored in the storage areas of the users "a" to "d" is illustrated in FIG. 5. Note that, at this point of time, the same information is stored as the candidate communication terminal identification information of the users "a" to "d".

Then, after a lapse of a certain time (S220), as illustrated in FIG. 4, the users "c" and "d" have gone, and the users "e" and "f" have newly entered the area 1. In such a situation, the person recognition processing unit 21 executes the processing of recognizing a person (S110), for the image information captured by the security camera, which has been acquired in the image information acquisition processing unit 20 (S100), similarly to the above description. That is, when referring to the recognition information storage unit 22 based on the face image information and the like of the users "a", "b", "e", and "f" recognized as the persons (S120), existence of the users "a" and "b" can be confirmed, and other users cannot be confirmed. Then, as for the users "a" and "b", the storage areas of the candidate communication terminal identification information of the users "a" and "b" stored in the communication terminal identification information storage unit 24 are identified (S160). Since the user "a" is recognized, the termination condition is not satisfied (S130). Therefore, the person IDs are allocated to the users "e" and "f" as the newly recognized persons, and the various types of information including the person IDs, the image information of the face portions, the wireless LAN communication spot where the persons have been recognized, and the recognition date and time are stored in the recognition information storage unit 22 (S140). Then, the storage areas of the candidate communication terminal identification information of the users "e" and "f" are secured in the communication terminal identification information storage unit 24 (S150).

The communication terminal identification information acquisition processing unit 23 acquires the MAC addresses and the date and time information stored in the wireless LAN switch 31 in the wireless LAN communication spot, based on the information that identifies the wireless LAN communication spot corresponding to the image information from which the persons have been recognized (S170). In FIG. 4, the users "a", "b", "e", and "f" exist in the area 1 at this point of time, and thus the respectively acquired MAC addresses "12-34-56-78-90-12", "34-56-78-90-12-34", "90-12-34-56-78-90", and "12-AB-34-CD-56-EF" of the portable communication terminals 4 have been sent to the wireless LAN switch 31 together with "area 1" that indicates the wireless LAN communication spot, and the date and time information. Therefore, the communication terminal identification information acquisition processing unit 23 acquires these pieces of information.

As for the users "e" and "f", the storage areas of the candidate communication terminal identification information in the communication terminal identification information storage unit 24 are empty (S180). Therefore, the MAC addresses and the date and time information acquired in S170 are stored as the candidate (S190). As for the users "a" and "b", the candidate communication terminal identification information in the communication terminal identification information storage unit 24 has already been stored. Therefore, the communication terminal identification information comparison processing unit 25 compares the candidate information of the MAC addresses stored in FIG. 5 and the newly acquired information of the MAC addresses (S200), and stores the overlapping MAC addresses "12-34-56-78-90-12" and "34-56-78-90-12-34" for the users "a"

and "b" as new candidate communication terminal identification information (S210). The communication terminal identification information storage unit 24 in this state is schematically illustrated in FIG. 6.

Further, after a lapse of a certain time (S220), as illustrated in FIG. 4, the user "b" has gone and a user "g" has newly entered the area 1. In such a situation, the person recognition processing unit 21 executes the processing of recognizing a person (S110), for the image information captured by the security camera, which has been acquired by the image information acquisition processing unit 20 (S100), similarly to the above description. That is, when referring to the recognition information storage unit 22 based on the face image information of the users "a", "e", "f", and "g" recognized as persons (S120), existence of the users "a", "e", and "f" can be confirmed, and other users cannot be confirmed. Then, as for the users "a", "e" and "f", the storage areas of the candidate communication terminal identification information of the users "a", "e", and "f" stored in the communication terminal identification information storage unit 24 are identified (S160). Since the user "a" is recognized, the termination condition is not satisfied (S130). Therefore, the person ID is allocated to the user "g" as the newly recognized person, and the various types of information including the person ID, the image information of the face portion, the wireless LAN communication spot where the person has been recognized, and the recognition date and time are stored in the recognition information storage unit 22 (S140). Then, the storage area of the candidate communication terminal identification information of the user "g" is secured in the communication terminal identification information storage unit 24 (S150).

The communication terminal identification information acquisition processing unit 23 acquires the MAC addresses and the date and time information stored in the wireless LAN switch 31 in the wireless LAN communication spot, based on the information that identifies the wireless LAN communication spot corresponding to the image information from which the persons have been recognized (S170). In FIG. 4, the users "a", "e", "f", and "g" exist in the area 1. Therefore, the respectively acquired MAC addresses "12-34-56-78-90-12", "90-12-34-56-78-90", "12-AB-34-CD-56-EF", and "34-GH-56-IJ-78-KL" of the portable communication terminals 4 have been sent to the wireless LAN switch 31 together with "area 1" that indicates the wireless LAN communication spot, and the date and time information. Therefore, the communication terminal identification information acquisition processing unit 23 acquires these pieces of information.

As for the user "g", the storage area of the candidate communication terminal identification information in the communication terminal identification information storage unit 24 is empty (S180). Therefore, the MAC address and the date and time information acquired in S170 are stored as the candidate (S190). As for the users "a", "e", and "f", the candidate communication terminal identification information in the communication terminal identification information storage unit 24 has already been stored. Therefore, the communication terminal identification information comparison processing unit 25 compares the candidate information of the MAC addresses stored in FIG. 6 and the newly acquired information of the MAC addresses (S200), and stores the overlapping MAC address "12-34-56-78-90-12" for the user "a", and the overlapping MAC addresses "12-34-56-78-90-12", "90-12-34-56-78-90", and "12-AB-34-CD-56-EF" for the users "e" and "f", as new candidate communication terminal identification information (S210).

The communication terminal identification information storage unit 24 in this state is schematically illustrated in FIG. 7.

At this point of time, the number of the candidate communication terminal identification information in the storage area of the user "a" in the communication terminal identification information storage unit 24 becomes one, and thus the termination condition is satisfied. Therefore, the output processing unit 26 identifies "12-34-56-78-90-12" stored in the storage area of the user "a" in the communication terminal identification information storage unit 24 as the MAC address used by the user "a", and executes the output processing for the identified address as the MAC address of the user "a".

If the number of the candidate communication terminal identification information of the user "a" is not one, after a lapse of a certain time (S170), as illustrated in FIG. 4, the user "a" has gone and a user "h" has newly entered the area 1. In such a situation, the person recognition processing unit 21 executes the processing of recognizing a person (S190), for the image information captured by the security camera, which has been acquired in the image information acquisition processing unit 20 (S180), similarly to S110. Then, existence of the users "e", "f", "g", and "h" can be confirmed. When referring to the person recognition processing unit 21, and the recognized users and the past recognition information are compared (S200), existence of the users "e", "f" and "g" can be confirmed, and the other user "h" cannot be confirmed.

Therefore, the termination condition about the user "a" is satisfied because the user "a" becomes unable to be detected. The output processing unit 26 identifies the MAC address stored in the storage area of the user "a" in the communication terminal identification information storage unit 24, at that point of time, and executes the output processing for the identified MAC address as the candidate MAC address of the user "a".

As described above, the termination condition may be, other than the condition that the number of the MAC addresses stored in the storage area of the user in the communication terminal identification information storage unit 24 becomes one, a condition that the user becomes unable to be detected in the image information captured by the security camera, or another condition may be arbitrarily set.

Note that, in the present embodiment, the functions of the management computer 2 may be included in the wireless LAN switch 31 in the wireless LAN communication spot, and the processing may be executed in the wireless LAN switch 31.

Second Embodiment

Figure 8:
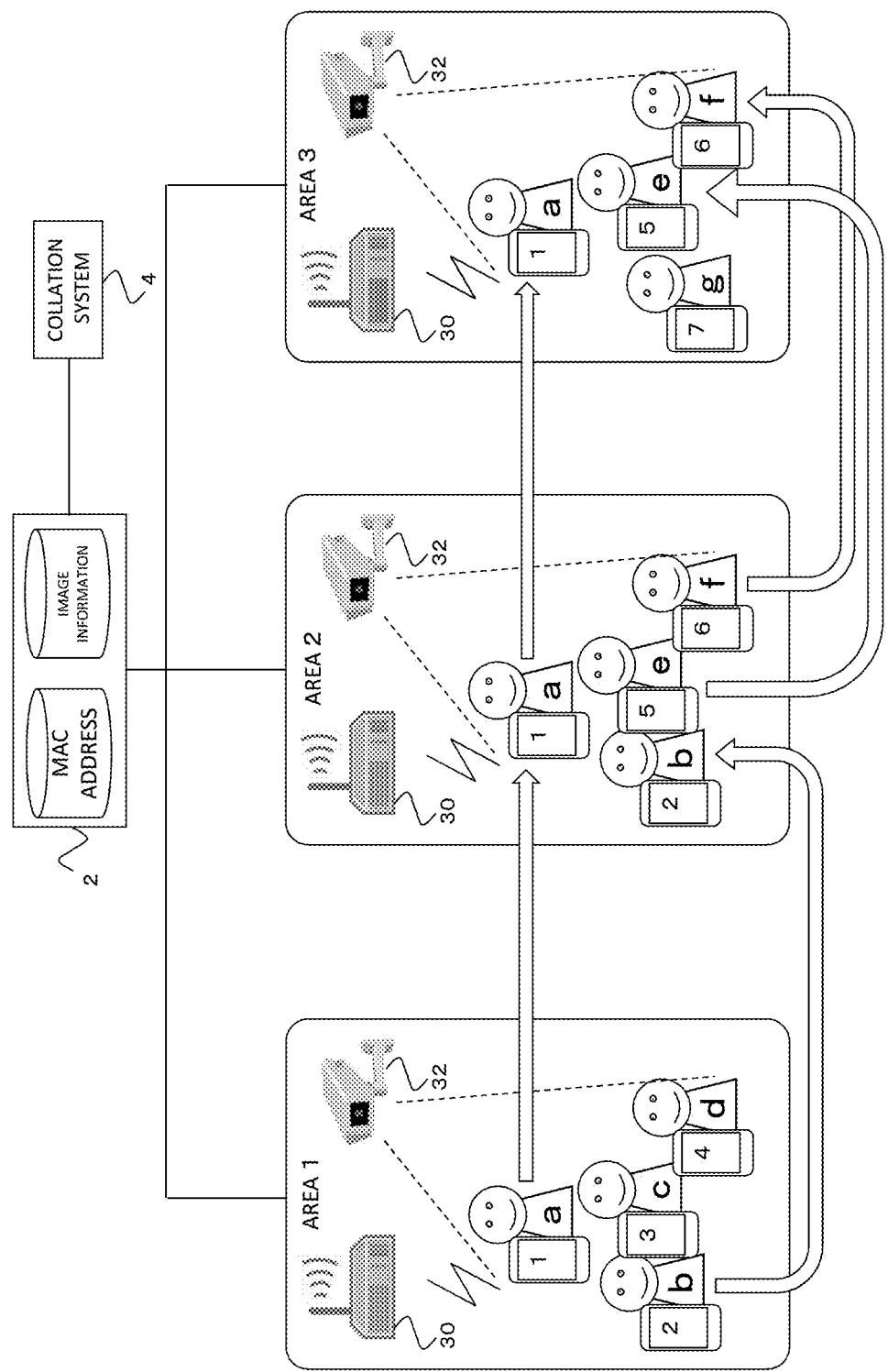
FIG. 8 is a conceptual diagram schematically illustrating a concept of processing in a second embodiment.

Next, as a second embodiment of the present invention, processing of a case where users move from one wireless LAN communication spot to another will be described as a modification of the first embodiment. A moving state of the users in this case is illustrated in FIG. 8.

The present embodiment illustrates a case in which three wireless LAN communication spots are installed in three places from an area 1 to an area 3 in a certain event site and security cameras are used as capturing devices 32, and image information obtained by capturing a part or the whole of a communicative range of the wireless LAN communication spot by the security camera is used. Note that similar processing can be executed even in a case of a plurality of event sites.

Members of persons in the areas 1 to 3 vary over time. That is, FIG. 8 illustrates a case in which there are four persons (users "a" to "d") in the area 1 at a certain point of time, there are four persons (the users "a", "b", "e", and "f") in the area 2 after a lapse of a predetermined time from the certain point of time, and there are four persons (the users "a", "e", "f", and "g") in the area 3 after a lapse of a predetermined time from the second point of time. That is, the users "a" and "b" initially existing in the area 1 move to the area 2, and the user "a" further moves to the area 3.

Further, in the areas 1 to 3, MAC addresses as communication terminal identification information are recorded in wireless LAN switches 31 at the respective points of time, and the security cameras capture images. Then, the MAC addresses and image information are sent to a management computer 2.

First, when a user is positioned in a communicative range of an access point 30 of the area 1 that is the wireless LAN communication spot, communication between a portable communication terminal 4 used by the user and the wireless LAN switch 31 is established, and the MAC address of the portable communication terminal 4 is sent to the wireless LAN switch 31 through the access point 30. The wireless LAN switch 31 stores the received MAC address together with information that identifies the wireless LAN communication spot, date and time information, and the like.

The security camera in the area 1 captures a capturing range as a moving image or a still image. Then, the security camera transmits the captured image information captured to the management computer 2 together with information that identifies the wireless LAN communication spot and the capturing device 32, date and time information of the capturing, and the like. The sent image information is acquired in an image information acquisition processing unit 20 of the management computer 2 (S100).

A person recognition processing unit 21 of the management computer 2 executes processing of recognizing whether a person appears in the acquired image information (S110). Then, when having recognized that a person appears, the person recognition processing unit 21 determines whether the person is a person having appeared in the past, by comparing the image information with information of persons recognized in the past, which has been stored in a recognition information storage unit 22 (S120). After the processing in the person recognition processing unit 21, an output processing unit 26 determines whether a termination condition, for example, a condition that a person who has been targeted becomes unable to be recognized, or a condition that the number of candidate communication terminal identification information of the person becomes one, has been satisfied (S130). When the output processing unit 26 determines that the termination condition has been satisfied, the output processing unit 26 outputs communication terminal identification information in a storage region of the person, which is stored in a communication terminal identification information storage unit 24. Meanwhile, when the termination condition is not satisfied, processing of S140 and subsequent steps is continued.

If a new person is recognized, arbitrary identification information (a person ID) is allocated to the person, and information of a face image, the person ID, date and time information of the recognition, information that indicates that the person has been recognized in the area 1, and the like are stored in the recognition information storage unit 22 (S140).

Meanwhile, as a result of the comparison with the recognition information storage unit 22, when the person has already been recognized, the person is identified.

For example, in the case of FIG. 8, at the initial point of time, the person recognition processing unit 21 recognizes that four persons of users "a", "b", "c", and "d" appear in the image information. When these four persons are collated with the recognition information storage unit 22 and whether these four persons are persons recognized in the past is determined, all of the four persons are determined to be new. Therefore, the person IDs are respectively allocated to the users "a" to "d", and various types of information including the person IDs, the image information of face portions, the wireless LAN communication spot where the persons have been recognized, and the recognition date and time are stored in the recognition information storage unit 22, as these four persons are newly recognized persons.

Then, since the four persons of the users "a", "b", "c" and "d" are newly recognized, the person recognition processing unit 21 secures storage areas for storing the candidate communication terminal identification information of the communication terminal identification information of the portable communication terminals 4 used by these four persons, in the communication terminal identification information storage unit 24 (S150).

Next, a communication terminal identification information acquisition processing unit 23 acquires the MAC addresses and the date and time information stored in the wireless LAN switch 31 in the wireless LAN communication spot, based on the information that identifies the wireless LAN communication spot corresponding to the image information from which the persons have been recognized (S170). In FIG. 8, in the area 1, the users "a" to "d" respectively use the first to fourth portable communication terminals 4, and the MAC addresses "12-34-56-78-90-12", "34-56-78-90-12-34", "56-78-90-12-34-56", and "78-90-12-34-56-78" of the respective portable communication terminals 4 have been sent to the wireless LAN switch 31 together with "area 1" that indicates the wireless LAN communication spot, and the date and time information. Therefore, the communication terminal identification information acquisition processing unit 23 acquires these pieces of information.

If storage areas of candidate communication terminal identification information in the communication terminal identification information storage unit 24 are empty (that is, when persons are newly recognized) (S180), the MAC addresses and the date and time information acquired in S170 are stored in the storage areas as the candidate communication terminal identification information (S190). That is, the acquired MAC addresses and date and time information are respectively stored in the communication terminal identification information storage unit 24, as the candidate communication terminal identification information of the users "a" to "d". An example of the candidate communication terminal identification information of the users "a" to "d" stored in the storage areas is similar to that in FIG. 5. Note that, at this point of time, the same information is stored as the candidate communication terminal identification information of the users "a" to "d".

While the processing for the area 1 is executed as described above, the users move from place to place over time. After a lapse of a certain time (S220), as illustrated in 8, assume that the users "a" and "b" having been in the area 1 move to the area 2, and the users "a", "b", "e", and "f" exist in the area 2. Even in this case, the wireless LAN switch 31 in the area 2 establishes connection with the portable communication terminals 4 of the respective users through the access point 30, and acquires the MAC addresses. Further, the security camera in the area 2 captures a communicative range of the area 2 or its periphery, and sends the captured image information to the management computer 2.

The person recognition processing unit 21 executes processing of recognizing a person (S110), for the image information captured by the security camera, which has been acquired in the image information acquisition processing unit 20 of the management computer 2 (S100), similarly to the above description. That is, when referring to the recognition information storage unit 22 based on the face image information and the like of the users "a", "b", "e", and "f" recognized as the persons (S120), existence of the users "a" and "b" can be confirmed, and other users cannot be confirmed. Then, as for the users "a" and "b", the storage areas of the candidate communication terminal identification information of the users "a" and "b" stored in the communication terminal identification information storage unit 24 are identified (S160). Since the user "a" is recognized, the termination condition is not satisfied (S130). Therefore, the person IDs are allocated to the users "e" and "f" as the newly recognized persons, and the various types of information including the person IDs, the image information of the face portions, the wireless LAN communication spot where the persons have been recognized, and the recognition date and time are stored in the recognition information storage unit 22 (S140). Then, the storage areas of the candidate communication terminal identification information of the users "e" and "f" are secured in the communication terminal identification information storage unit 24 (S150).

The communication terminal identification information acquisition processing unit 23 acquires the MAC addresses and the date and time information stored in the wireless LAN switch 31 in the wireless LAN communication spot, based on the information that identifies the wireless LAN communication spot corresponding to the image information from which the persons have been recognized (S170). In FIG. 8, the users "a", "b", "e", and "f" exist in the area 2 at this point of time, and thus the respectively acquired MAC addresses "12-34-56-78-90-12", "34-56-78-90-12-34", "90-12-34-56-78-90", and "12-AB-34-CD-56-EF" of the portable communication terminals 4 have been sent to the wireless LAN switch 31 together with "area 2" that indicates the wireless LAN communication spot, and the date and time information. Therefore, the communication terminal identification information acquisition processing unit 23 acquires these pieces of information.

As for the users "e" and "f", the storage areas of the candidate communication terminal identification information in the communication terminal identification information storage unit 24 are empty (S180). Therefore, the MAC addresses and the date and time information acquired in S170 are stored as the candidate (S190). As for the users "a" and "b", the candidate communication terminal identification information in the communication terminal identification information storage unit 24 has already been stored. Therefore, a communication terminal identification information comparison processing unit 25 compares the candidate information of the MAC addresses stored in FIG. 5 and the newly acquired information of the MAC addresses (S200), and stores the overlapping MAC addresses "12-34-56-78-90-12" and "34-56-78-90-12-34" for the users "a" and "b" as new candidate communication terminal identification information (S210). The communication terminal identification information storage unit 24 in this state is schematically illustrated in FIG. 9.

Assume that, over a certain time period (S220), the users "a", "e", and "f" move from the area 2 to the area 3, and the users "a", "e", "f", and "g" exist in the area 3. Even in this case, the wireless LAN switch 31 in the area 3 establishes connection with the portable communication terminals 4 of the respective users through the access point 30, and acquires the MAC addresses. Further, the security camera in the area 3 captures the communicative range of the area 3 or its periphery, and sends the captured image information to the management computer 2.

The person recognition processing unit 21 executes processing of recognizing a person (S110), for the image information captured by the security camera, which has been acquired in the image information acquisition processing unit 20 of the management computer 2 (S100), similarly to the above description. That is, when referring to the recognition information storage unit 22 based on the face image information and the like of the users "a", "e", "f", and "g" recognized as the persons (S120), existence of the users "a", "e", and "f" can be confirmed, and other users cannot be confirmed. Then, as for the users "a", "e" and "f", the storage areas of the candidate communication terminal identification information of the users "a", "e" and "f" stored in the communication terminal identification information storage unit 24 are identified (S160). Since the user "a" is recognized, the termination condition is not satisfied (S130). Therefore, the person ID is allocated to the user "g" as the newly recognized person, and the various types of information including the person ID, the image information of the face portion, the wireless LAN communication spot where the person has been recognized, and the recognition date and time are stored in the recognition information storage unit 22 (S140). Then, the storage area of the candidate communication terminal identification information of the user "g" is secured in the communication terminal identification information storage unit 24 (S150).

The communication terminal identification information acquisition processing unit 23 acquires the MAC addresses and the date and time information stored in the wireless LAN switch 31 in the wireless LAN communication spot, based on the information that identifies the wireless LAN communication spot corresponding to the image information from which the persons have been recognized (S170). In FIG. 8, the users "a", "e" "f", and "g" exist in the area 3, and thus the respectively acquired MAC addresses "12-34-56-78-90-12", "90-12-34-56-78-90", "12-AB-34-CD-56-EF", and "34-GH-56-IJ-78-KL" of the portable communication terminals 4 have been sent to the wireless LAN switch 31 together with "area 3" that indicates the wireless LAN communication spot, and the date and time information. Therefore, the communication terminal identification information acquisition processing unit 23 acquires these pieces of information.

As for the user "g", the storage area of the candidate communication terminal identification information in the communication terminal identification information storage unit 24 is empty (S180). Therefore, the MAC address and the date and time information acquired in S170 are stored as the candidate (S190). As for the users "a", "e", and "f", the candidate communication terminal identification information in the communication terminal identification information storage unit 24 has already been stored. Therefore, the communication terminal identification information comparison processing unit 25 compares the candidate information of the MAC addresses stored in FIG. 9 and the newly acquired information of the MAC addresses (S200), and stores the overlapping MAC address "12-34-56-78-90-12" for the user "a", and the overlapping MAC addresses "12-34-56-78-90-12", "90-12-34-56-78-90", and "12-AB-34-CD-56-EF" for the users "e" and "f", as new candidate communication terminal identification information (S210). The communication terminal identification information storage unit 24 in this state is schematically illustrated in FIG. 10.

At this point of time, the number of the candidate communication terminal identification information in the storage area of the user "a" in the communication terminal identification information storage unit 24 becomes one, and thus the termination condition is satisfied. Therefore, the output processing unit 26 identifies "12-34-56-78-90-12" stored in the storage area of the user "a" in the communication terminal identification information storage unit 24 as the MAC address used by the user "a", and executes the output processing for the identified address as the MAC address of the user "a".

If the number of the candidate communication terminal identification information of the user "a" is not one, after a lapse of a certain time (S170), when the user "a" becomes unable to be detected from the image information captured by the security camera in any of the areas, the termination condition about the user "a" is satisfied because the user "a" becomes unable to be detected, and the output processing unit 26 identifies the MAC address stored in the storage area of the user "a" in the communication terminal identification information storage unit 24 at the point of time, and executes the output processing for the identified address as the candidate MAC address of the user "a".

Third Embodiment

Figure 11:
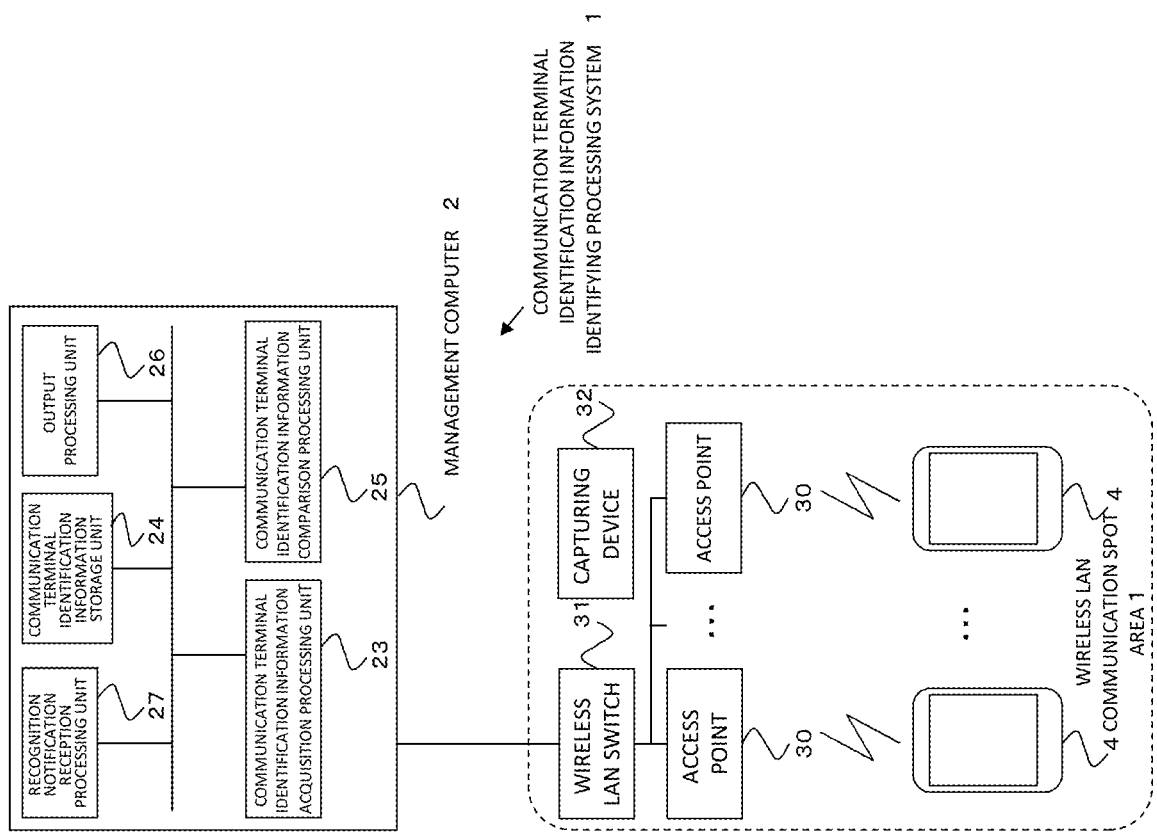
FIG. 11 is a diagram schematically illustrating an example of a system configuration in a third embodiment.

In the first and second embodiments, the processing of recognizing a person has been performed by the management computer 2. However, in a third embodiment, a case where processing of recognizing a person is performed by a capturing device 32 will be described. That is, a case in which a person recognition processing unit 21 and a recognition information storage unit 22 in FIG. 1 are incorporated in the capturing device 32 will be described. An example of a system configuration in the third embodiment is schematically illustrated in FIG. 11.

A management computer 2 includes a recognition notification reception processing unit 27, a communication terminal identification information acquisition processing unit 23, a communication terminal identification information storage unit 24, a communication terminal identification information comparison processing unit 25, and an output processing unit 26.

The recognition notification reception processing unit 27 receives, when a person is recognized in the capturing device 32, notification of the recognition. When having received notification of the recognition of a new person, the recognition notification reception processing unit 27 secures a storage area for storing candidate communication terminal identification information for the person, in the communication terminal identification information storage unit 24. Further, when having received notification of a person who has already been recognized, the recognition notification reception processing unit 27 identifies the storage region for storing the candidate communication terminal identification information for the person in the communication terminal identification information storage unit 24.

Functions of the communication terminal identification information acquisition processing unit 23, the communication terminal identification information storage unit 24, the communication terminal identification information comparison processing unit 25, and the output processing unit 26 are nearly similar to those in the first and second embodiments.

Figure 12:
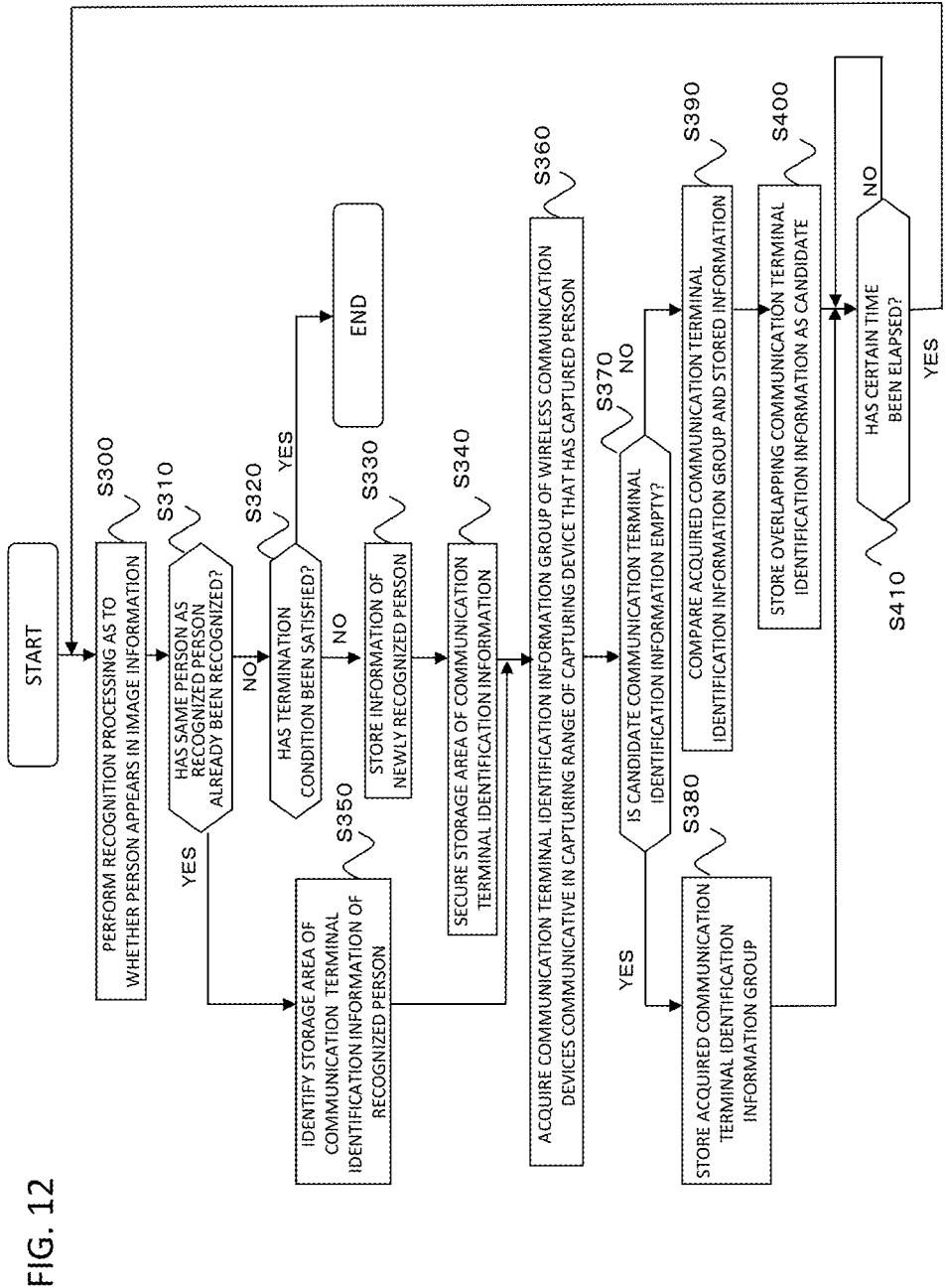
FIG. 12 is a flowchart schematically illustrating an example of a processing process in the third embodiment.

Next, an example of a processing process in the present embodiment will be described using the flowchart of FIG. 12. Note that a moving state of users is similar to that of FIG. 4. That is, an area 1 is provided as a wireless LAN communication spot, and an access point 30, a wireless LAN switch 31, and a security camera are installed in the area 1. Then, members of persons existing in the area 1 vary over time. That is, FIG. 4 illustrates a case in which there are four persons (users "a" to "d") in the area 1 at a certain point of time, there are four persons (the users "a", "b", "e", and "f") after a lapse of a predetermined time from the certain point of time, and there are four persons (the users "a", "e", "f", and "g") after a lapse of a predetermined time from the second point of time. That is, the members of users initially existing in the area 1 are changed from the four users "a" to "d" to the four users "a", "b", "e", and "f" (the users "c" and "d" have gone from the area 1 and the users "e" and "f" have entered the area 1), and then to the four users "a", "e", "f", and "g" (the user "b" has gone from the area 1 and the user "g" has entered the area 1).

Further, in the area 1, MAC addresses are recorded in the wireless LAN switches 31 at the respective points of time, and the security camera captures images. Then, the MAC addresses and image information are sent to the management computer 2.

First, when a user is positioned in a communicative range of the access point 30 of the area 1 that is the wireless LAN communication spot, communication between a portable communication terminal 4 used by the user and the wireless LAN switch 31 is established, and the MAC address of the portable communication terminal 4 is sent to the wireless LAN switch 31 through the access point 30. The wireless LAN switch 31 stores the received MAC address together with information that identifies the wireless LAN communication spot, date and time information, and the like.

The security camera in the area 1 captures a capturing range as a moving image or a still image. A person recognition processing unit 21 of the security camera executes recognition processing as to whether a person appears in the captured image information (S300). Then, when having recognized that a person appears, the person recognition processing unit 21 determines whether the person is a person having appeared in the past, by comparing the image information with information of persons recognized in the past, which has been stored in a recognition information storage unit 22 (S310). Then, the person recognition processing unit 21 notifies the management computer 2 of the recognition of a new person, and the recognition notification reception processing unit 27 of the management computer 2 receives the notification. Since the recognition notification reception processing unit 27 of the management computer 2 has received the notification, the output processing unit 26 determines a termination condition, for example, a condition that a person who has been targeted becomes unable to be recognized, or a condition that the number of candidate communication terminal identification information of the person becomes one, has been satisfied (S320). When having determined that the termination condition has been satisfied, the output processing unit 26 outputs communication terminal identification information in the storage area of the person, which has been stored in the communication terminal identification information storage unit 24. Meanwhile, when the termination condition is not satisfied, processing of S330 and subsequent steps is continued.

If a new person is recognized, arbitrary identification information (a person ID) is allocated to the person, and information of a face image, the person ID, date and time information of the recognition, information that indicates that the person has been recognized in the area 1, and the like are stored in the recognition information storage unit 22 (S330).

Meanwhile, as a result of the comparison with the recognition information storage unit 22, when the person has already been recognized, the person is identified.

For example, in the case of FIG. 4, at an initial point of time, the person recognition processing unit 21 recognizes that four persons of users "a", "b", "c", and "d" appear in the image information. When these four persons are collated with the recognition information storage unit 22 and whether these four persons are persons recognized in the past is determined, all of the four persons are determined to be new. Therefore, the person recognition processing unit 21 notifies the management computer 2 of the recognition of the users "a", "b", "c", and "d" as new persons, and the recognition notification reception processing unit 27 of the management computer 2 receives the notification. Further, since the user "a" is recognized, the termination condition is not satisfied (S320), the capturing device 32 respectively allocates the person IDs to the users "a" to "d", and stores various types of information including the person IDs, the image information of face portions, the wireless LAN communication spot where the persons have been recognized, and recognition date and time in the recognition information storage unit 22, as these four persons are newly recognized persons (S330).

Then, since the recognition notification reception processing unit 27 has received the notification that the four persons of the users "a", "b", "c", and "d" have been newly recognized, the recognition notification reception processing unit 27 secures storage areas for storing candidate communication terminal identification information of communication terminal identification information of the portable communication terminals 4 used by the four persons, in the communication terminal identification information storage unit 24 (S340).

Next, the communication terminal identification information acquisition processing unit 23 acquires the MAC addresses and the date and time information stored in the wireless LAN switch 31 in the wireless LAN communication spot, based on the information that identifies the wireless LAN communication spot corresponding to the image information from which the persons have been recognized (S360). In FIG. 4, in the area 1, the users "a" to "d" respectively use the first to fourth portable communication terminals 4, and the MAC addresses "12-34-56-78-90-12", "34-56-78-90-12-34", "56-78-90-12-34-56", and "78-90-12-34-56-78" of the respective portable communication terminals 4 have been sent to the wireless LAN switch 31 together with "area 1" that indicates the wireless LAN communication spot, and the date and time information. Therefore, the communication terminal identification information acquisition processing unit 23 acquires these pieces of information.

If the storage areas of the candidate communication terminal identification information in the communication terminal identification information storage unit 24 are empty (that is, when persons are newly recognized) (S370), the MAC addresses and the date and time information acquired in S360 are stored in the storage areas as the candidate communication terminal identification information (S380). That is, the acquired MAC addresses and date and time information are respectively stored as the candidate communication terminal identification information of the users "a" to "d". An example of the candidate communication terminal identification information stored in the storage areas of the users "a" to "d" is illustrated in FIG. 5. Note that, at this point of time, the same information is stored as the candidate communication terminal identification information of the users "a" to "d".

Then, after a lapse of a certain time (S410), as illustrated in FIG. 4, the users "c" and "d" have gone, and the users "e" and "f" have newly entered the area 1. In such a situation, the person recognition processing unit 21 executes the processing of recognizing a person, for the image information captured by the security camera, which has been acquired in the image information acquisition processing unit 20 (S300). That is, when referring to the recognition information storage unit 22 based on the face image information and the like of the users "a", "b", "e", and"f" recognized as the persons (S310), existence of the users "a" and "b" can be confirmed, and other users cannot be confirmed. Then, the capturing device 32 sends a notification that the users "a" and "b" have been recognized, and the users "e" and "f" have been recognized as new users to the management computer 2.

The recognition notification reception processing unit 27 of the management computer 2 receives the notification, and the recognition notification reception processing unit 27 identifies, regarding the users "a" and "b", the storage areas of the candidate communication terminal identification information of the users "a" and "b" stored in the communication terminal identification information storage unit 24 (S350). Further, since the user "a" is recognized, the termination condition is not satisfied (S320). Therefore, the person IDs are allocated to the users "e" and "f" as the newly recognized persons, and the various types of information including the person IDs, the image information of the face portions, the wireless LAN communication spot where the persons have been recognized, and the recognition date and time are stored in the recognition information storage unit 22 (S330). Then, the recognition notification reception processing unit 27 of the management computer 2 secures the storage areas of the candidate communication terminal identification information of the users "e" and "f", in the communication terminal identification information storage unit 24 (S340).

The communication terminal identification information acquisition processing unit 23 acquires the MAC addresses and the date and time information stored in the wireless LAN switch 31 in the wireless LAN communication spot, based on the information that identifies the wireless LAN communication spot corresponding to the image information from which the persons have been recognized (S360). In FIG. 4, the users "a", "b", "e", and "f" exist in the area 1 at this point of time, and thus the respectively acquired MAC addresses "12-34-56-78-90-12", "34-56-78-90-12-34", "90-12-34-56-78-90", and "12-AB-34-CD-56-EF" of the portable communication terminals 4 have been sent to the wireless LAN switch 31 together with "area 1" that indicates the wireless LAN communication spot, and the date and time information. Therefore, the communication terminal identification information acquisition processing unit 23 acquires these pieces of information.

As for the users "e" and "f", the storage areas of the candidate communication terminal identification information in the communication terminal identification information storage unit 24 are empty (S370). Therefore, the MAC addresses and the date and time information acquired in S360 are stored as the candidate (S380). As for the users "a" and "b", the candidate communication terminal identification information in the communication terminal identification information storage unit 24 has already been stored. Therefore, the communication terminal identification information comparison processing unit 25 compares the candidate MAC address information stored in FIG. 5 and the newly acquired MAC address information (S390), and stores the overlapping MAC addresses "12-34-56-78-90-12" and "34-56-78-90-12-34" for the users "a" and "b" as new candidate communication terminal identification information (S400). The communication terminal identification information storage unit 24 in this state is schematically illustrated in FIG. 6.

Further, after a lapse of a certain time (S410), as illustrated in FIG. 4, the user "b" has gone and the user "g" has newly entered the area 1. In such a situation, the person recognition processing unit 21 executes the processing of recognizing a person (S300), for the image information captured by the security camera, which has been acquired by the image information acquisition processing unit 20. That is, when referring to the recognition information storage unit 22 based on the face image information of the users "a", "e", "f", and "g" recognized as persons (S310), existence of the users "a", "e", and "f" can be confirmed, and other users cannot be confirmed. Notification of recognition of the users "a" and "b", and recognition of the users "e" and "f" as new users are sent from the capturing device 32 to the management computer 2.

The recognition notification reception processing unit 27 of the management computer 2 receives the notification, and the recognition notification reception processing unit 27 identifies, regarding the users "a", "e", and "f", the storage areas of the candidate communication terminal identification information of the users "a", "e", and "f" stored in the communication terminal identification information storage unit 24 (S350). Further, since the user "a" is recognized, the termination condition is not satisfied (S320). Therefore, the person IDs are allocated to the user "g" as the newly recognized persons, and the various types of information including the person ID the image information of the face portion, the wireless LAN communication spot where the person has been recognized, and the recognition date and time are stored in the recognition information storage unit 22 (S330). Then, the recognition notification reception processing unit 27 of the management computer 2 secures the storage area of the candidate communication terminal identification information of the user "g", in the communication terminal identification information storage unit 24 (S340).

The communication terminal identification information acquisition processing unit 23 acquires the MAC addresses and the date and time information stored in the wireless LAN switch 31 in the wireless LAN communication spot, based on the information that identifies the wireless LAN communication spot corresponding to the image information from which the persons have been recognized (S360). In FIG. 4, the users "a", "e", "f", and "g" exist in the area 1. Therefore, the respectively acquired MAC addresses "12-34-56-78-90-12", "90-12-34-56-78-90", "12-AB-34-CD-56-EF", and "34-GH-56-IJ-78-KL" of the portable communication terminals 4 have been sent to the wireless LAN switch 31 together with "area 1" that indicates the wireless LAN communication spot, and the date and time information. Therefore, the communication terminal identification information acquisition processing unit 23 acquires these pieces of information.

As for the user "g", the storage area of the candidate communication terminal identification information in the communication terminal identification information storage unit 24 is empty (S370). Therefore, the MAC address and the date and time information acquired in S360 are stored as the candidate (S380). As for the users "a", "e", and "f", the candidate communication terminal identification information in the communication terminal identification information storage unit 24 has already been stored. Therefore, the communication terminal identification information comparison processing unit 25 compares the candidate information of the MAC addresses stored in FIG. 6 and the newly acquired information of the MAC addresses (S390), and stores the overlapping MAC address "12-34-56-78-90-12" for the user "a", and the overlapping MAC addresses "12-34-56-78-90-12", "90-12-34-56-78-90", and "12-AB-34-CD-56-EF" for the users "e" and "f", as new candidate communication terminal identification information (S400). The communication terminal identification information storage unit 24 in this state is schematically illustrated in FIG. 7.

At this point of time, the number of the candidate communication terminal identification information in the storage area of the user "a" in the communication terminal identification information storage unit 24 becomes one, and thus the termination condition is satisfied. Therefore, the output processing unit 26 identifies "12-34-56-78-90-12" stored in the storage area of the user "a" in the communication terminal identification information storage unit 24 as the MAC address used by the user "a", and executes the output processing for the identified address as the MAC address of the user "a".

If the number of the candidate communication terminal identification information of the user "a" is not one, similarly to the first embodiment, the termination condition is satisfied at a point of time when the user "a" becomes unable to be detected in the capturing device 32, and the capturing device 32 sends notification thereof to the management computer 2. Upon receipt of the notification, the output processing unit 26 identifies the MAC address stored in the storage area of the user "a" in the communication terminal identification information storage unit 24 at the point of time, and executes the output processing for the identified address as the candidate MAC address of the user "a".

As described above, the termination condition may be, other than the condition that the number of the MAC addresses stored in the storage area of the user in the communication terminal identification information storage unit 24 becomes one, a condition that the user becomes unable to be detected in the image information captured by the security camera, or another condition may be arbitrarily set.

Note that, in the present embodiment, the functions of the management computer 2 may be included in the wireless LAN switch 31 in the wireless LAN communication spot, and the processing may be executed in the wireless LAN switch 31.

Fourth Embodiment

Next, as a fourth embodiment of the present invention, processing of a case where users move from one wireless LAN communication spot to another (similarly to the second embodiment) will be described as a modification of the third embodiment. A moving state of the users in this case is illustrated in FIG. 8.

In the present embodiment, similarly to the case of the second embodiment, members of persons in the areas 1 to 3 vary over time. That is, FIG. 8 illustrates a case in which there are four persons (users "a" to "d") in the area 1 at a certain point of time, there are four persons (the users "a", "b", "e", and "f") in the area 2 after a lapse of a predetermined time from the certain point of time, and there are four persons (the users "a", "e", "f", and "g") in the area 3 after a lapse of a predetermined time from the second point of time. That is, the users "a" and "b" initially existing in the area 1 move to the area 2, and the user "a" further moves to the area 3.

First, when a user is positioned in a communicative range of an access point 30 of the area 1 that is the wireless LAN communication spot, communication between a portable communication terminal 4 used by the user and the wireless LAN switch 31 is established, and a MAC address of the portable communication terminal 4 is sent to the wireless LAN switch 31 through the access point 30. The wireless LAN switch 31 stores the received MAC address together with information that identifies the wireless LAN communication spot, date and time information, and the like.

The security camera in the area 1 captures a capturing range as a moving image or a still image. A person recognition processing unit 21 of the security camera executes recognition processing as to whether a person appears in the captured image information (S300). Then, when having recognized that a person appears, the person recognition processing unit 21 determines whether the person is a person having appeared in the past, by comparing the image information with information of persons recognized in the past, which has been stored in a recognition information storage unit 22 (S310). Then, the person recognition processing unit 21 notifies a management computer 2 of the recognition of a new person, and a recognition notification reception processing unit 27 of the management computer 2 receives the notification. Since the recognition notification reception processing unit 27 of the management computer 2 has received the notification, an output processing unit 26 determines a termination condition, for example, a condition that a person who has been targeted becomes unable to be recognized, or a condition that the number of candidate communication terminal identification information of the person becomes one, has been satisfied (S320). When having determined that the termination condition has been satisfied, the output processing unit 26 outputs communication terminal identification information in the storage area of the person, which has been stored in a communication terminal identification information storage unit 24. Meanwhile, when the termination condition is not satisfied, processing of S330 and subsequent steps is continued.

If a new person is recognized, arbitrary identification information (a person ID) is allocated to the person, and information of a face image, the person ID, date and time information of the recognition, information that indicates that the person has been recognized in the area 1, and the like are stored in the recognition information storage unit 22 (S330).

Meanwhile, as a result of the comparison with the recognition information storage unit 22, when the person has already been recognized, the person is identified.

For example, in the case of FIG. 8, at an initial point of time, the person recognition processing unit 21 recognizes that four persons of users "a", "b", "c", and "d" appear in the image information. When these four persons are collated with the recognition information storage unit 22 and whether these four persons are persons recognized in the past is determined, all of the four persons are determined to be new. Therefore, the person recognition processing unit 2*l* notifies the management computer 2 of the recognition of the users "a", "b", "c", and "d" as new persons, and the recognition notification reception processing unit 27 of the management computer 2 receives the notification. A capturing device 32 respectively allocates the person IDs to the users "a" to "d", and stores various types of information including the person IDs, the image information of face portions, the wireless LAN communication spot where the persons have been recognized, and recognition date and time in the recognition information storage unit 22, as these four persons are newly recognized persons (S330).

Then, since the recognition notification reception processing unit 27 has received the notification that the four persons of the users "a", "b", "c", and "d" have been newly recognized, the recognition notification reception processing unit 27 secures storage areas for storing candidate communication terminal identification information of communication terminal identification information of the portable communication terminals 4 used by the four persons, in the communication terminal identification information storage unit 24 (S340).

Next, a communication terminal identification information acquisition processing unit 23 acquires the MAC addresses and the date and time information stored in the wireless LAN switch 31 in the wireless LAN communication spot, based on the information that identifies the wireless LAN communication spot corresponding to the image information from which the persons have been recognized (S360). In FIG. 8, in the area 1, the users "a" to "d" respectively use the first to fourth portable communication terminals 4, and the MAC addresses "12-34-56-78-90-12", "34-56-78-90-12-34", "56-78-90-12-34-56", and "78-90-12-34-56-78" of the respective portable communication terminals 4 have been sent to the wireless LAN switch 31 together with "area 1" that indicates the wireless LAN communication spot, and the date and time information. Therefore, the communication terminal identification information acquisition processing unit 23 acquires these pieces of information.

If the storage areas of the candidate communication terminal identification information in the communication terminal identification information storage unit 24 are empty (that is, when persons are newly recognized) (S370), the MAC addresses and the date and time information acquired in S360 are stored in the storage areas as the candidate communication terminal identification information (S380). That is, the acquired MAC addresses and date and time information are respectively stored as the candidate communication terminal identification information of the users "a" to "d". An example of the candidate communication terminal identification information stored in the storage areas of the users "a" to "d" is illustrated in FIG. 5. Note that, at this point of time, the same information is stored as the candidate communication terminal identification information of the users "a" to "d".

While the processing for the area 1 is executed as described above, the users move from place to place over time. After a lapse of a certain time (S410), as illustrated in 8, assume that the users "a" and "b" having been in the area 1 move to the area 2, and the users "a", "b", "e", and "f" exist in the area 2. Even in this case, the wireless LAN switch 31 in the area 2 establishes connection with the portable communication terminals 4 of the respective users through the access point 30, and acquires the MAC addresses. Further, the security camera in the area 2 captures a communicative range of the area 2 or its periphery.

The person recognition processing unit 21 of the capturing device 32 executes processing of recognizing a person (S300), for the captured image information. That is, when referring to the recognition information storage unit 22 based on the face image information and the like of the users "a", "b", "e", and "f" recognized as the persons (S310), existence of the users "a" and "b" can be confirmed, and other users cannot be confirmed. Then, as for the users "a" and "b", the storage areas of the candidate communication terminal identification information of the users "a" and "b" stored in the communication terminal identification information storage unit 24 are identified (S350). Since the user "a" is recognized, the termination condition is not satisfied (S320). Therefore, in the capturing device 32, the person IDs are allocated to the users "e" and "f" as the newly recognized persons, and various types of information including the person IDs, the image information of the face portions, the wireless LAN communication spot where the persons have been recognized, and the recognition date and time are stored in the recognition information storage unit 22 (S330). Then, the recognition notification reception processing unit 27 of the management computer 2 secures the storage areas of the candidate communication terminal identification information of the users "e" and "f", in the communication terminal identification information storage unit 24 (S340).

The communication terminal identification information acquisition processing unit 23 acquires the MAC addresses and the date and time information stored in the wireless LAN switch 31 in the wireless LAN communication spot, based on the information that identifies the wireless LAN communication spot corresponding to the image information from which the persons have been recognized (S360). In FIG. 8, the users "a", "b", "e", and "f" exist in the area 2 at this point of time, and thus the respectively acquired MAC addresses "12-34-56-78-90-12", "34-56-78-90-12-34", "90-12-34-56-78-90", and "12-AB-34-CD-56-EF" of the portable communication terminals 4 have been sent to the wireless LAN switch 31 together with "area 2" that indicates the wireless LAN communication spot, and the date and time information. Therefore, the communication terminal identification information acquisition processing unit 23 acquires these pieces of information.

As for the users "e" and "f", the storage areas of the candidate communication terminal identification information in the communication terminal identification information storage unit 24 are empty (S370). Therefore, the MAC addresses and the date and time information acquired in S360 are stored as the candidate (S380). As for the users "a" and "b", the candidate communication terminal identification information in the communication terminal identification information storage unit 24 has already been stored. Therefore, a communication terminal identification information comparison processing unit 25 compares the candidate information of the MAC addresses stored in FIG. 5 and the newly acquired information of the MAC addresses (S390), and stores the overlapping MAC addresses "12-34-56-78-90-12" and "34-56-78-90-12-34" for the users "a" and "b" as new candidate communication terminal identification information (S400). The communication terminal identification information storage unit 24 in this state is schematically illustrated in FIG. 9.

Assume that, over a certain time period (S410), the users "a", "e", and "f" move from the area 2 to the area 3, and the users "a", "e", "f", and "g" exist in the area 3. Even in this case, the wireless LAN switch 31 in the area 3 establishes connection with the portable communication terminals 4 of the respective users through the access point 30, and acquires the MAC addresses. Further, the security camera in the area 3 captures the communicative range of the area 3 or its periphery.

The person recognition processing unit 21 of the capturing device 32 executes processing of recognizing a person (S300), for the captured image information. That is, when referring to the recognition information storage unit 22 based on the face image information and the like of the users "a", "e", "f", and "g" recognized as the persons (S310), existence of the users "a", "e", and "f" can be confirmed, and other users cannot be confirmed. Then, as for the users "a", "e" and "f", the storage areas of the candidate communication terminal identification information of the users "a", "e" and "f" stored in the communication terminal identification information storage unit 24 are identified (S350). Since the user "a" is recognized, the termination condition is not satisfied (S320). Therefore, in the capturing device 32, the person ID is allocated to the user "g" as the newly recognized person, and the various types of information including the person ID, the image information of the face portion, the wireless LAN communication spot where the person has been recognized, and the recognition date and time are stored in the recognition information storage unit 22 (S330). Then, the recognition notification reception processing unit 27 of the management computer 2 secures the storage areas of the candidate communication terminal identification information of the users "e" and "f", in the communication terminal identification information storage unit 24 (S340).

The communication terminal identification information acquisition processing unit 23 acquires the MAC addresses and the date and time information stored in the wireless LAN switch 31 in the wireless LAN communication spot, based on the information that identifies the wireless LAN communication spot corresponding to the image information from which the persons have been recognized (S360). In FIG. 8, the users "a", "e" "f", and "g" exist in the area 3, and thus the respectively acquired MAC addresses "12-34-56-78-90-12", "90-12-34-56-78-90", "12-AB-34-CD-56-EF", and "34-GH-56-IJ-78-KL" of the portable communication terminals 4 have been sent to the wireless LAN switch 31 together with "area 3" that indicates the wireless LAN communication spot, and the date and time information. Therefore, the communication terminal identification information acquisition processing unit 23 acquires these pieces of information.

As for the user "g", the storage area of the candidate communication terminal identification information in the communication terminal identification information storage unit 24 is empty (S370). Therefore, the MAC address and the date and time information acquired in S360 are stored as the candidate (S380). As for the users "a", "e", and "f", the candidate communication terminal identification information in the communication terminal identification information storage unit 24 has already been stored. Therefore, the communication terminal identification information comparison processing unit 25 compares the candidate information of the MAC addresses stored in FIG. 9 and the newly acquired information of the MAC addresses (S390), and stores the overlapping MAC address "12-34-56-78-90-12" for the user "a", and the overlapping MAC addresses "12-34-56-78-90-12", "90-12-34-56-78-90", and "12-AB-34-CD-56-EF" for the users "e" and "f", as new candidate communication terminal identification information (S400).

The communication terminal identification information storage unit 24 in this state is schematically illustrated in FIG. 10.

At this point of time, the number of the candidate communication terminal identification information in the storage area of the user "a" in the communication terminal identification information storage unit 24 becomes one, and thus the termination condition is satisfied. Therefore, the output processing unit 26 identifies "12-34-56-78-90-12" stored in the storage area of the user "a" in the communication terminal identification information storage unit 24 as the MAC address used by the user "a", and executes the output processing for the identified address as the MAC address of the user "a".

If the number of the candidate communication terminal identification information of the user "a" is not one, similarly to the second embodiment, the termination condition is satisfied at a point of time when the user "a" becomes unable to be detected in the capturing device 32, and the capturing device 32 sends notification thereof to the management computer 2. Upon receipt of the notification, the output processing unit 26 of the management computer 2 identifies the MAC address stored in the storage area of the user "a" in the communication terminal identification information storage unit 24 at the point of time, and executes the output processing for the identified address as the candidate MAC address of the user "a".

As described above, the termination condition may be, other than the condition that the number of the MAC addresses stored in the storage area of the user in the communication terminal identification information storage unit 24 becomes one, a condition that the user becomes unable to be detected in the image information captured by the security camera, or another condition may be arbitrarily set.

Fifth Embodiment

Next, a modification in the first to fourth embodiments will be described. In the present embodiment, characteristic information of an individual, which is used for person recognition processing such as face image information of a person (user), and attribute information of the individual are further stored in a management computer 2 or a capturing device 32 in the first to fourth embodiments.

In the case of the present embodiment, an attribute information storage unit (not illustrated) is further included in the management computer 2 or the capturing device 32. Who the person recognized by a person recognition processing unit 21 is specifically identified by reference to the attribute information storage unit, and is stored in a recognition information storage unit 22.

That is, in the attribute information storage unit, the characteristic information such as the face image information of individuals, and the attribute information such as names, addresses, and ages are stored. Further, upon recognition of a person, the person recognition processing unit 21 further compares the person and the characteristic information such as the face image information stored in the attribute information storage unit, thereby to identify who the recognized person is. When the recognized person is identified, the recognition information storage unit 22 stores the attribute information of the person in addition to and in association with information of a face image, a person ID, date and time information of the recognition, information that indicates the wireless LAN communication spot where the person has been recognized, and the like.

By including the configuration like the present embodiment is included, "whose" communication terminal identification information can be identified, which cannot be identified in the first to fourth embodiments.

Note that the attribute information storage unit may be included in some of devices in the wireless LAN communication spot, such as the capturing device 32, instead of being included in the management computer 2. Further, it may be configured such that the attribute information storage unit is included in a computer of a investigating authority, face image information and the like recognized from image information captured by the capturing device 32 is sent from the management computer 2 or the capturing device 32 to the computer of the investigating authority, and the attribute information of a matched person is received from the computer of the investigating authority.

Sixth Embodiment

Next, a modification of the first to fifth embodiments will be described. In the present embodiment, an access point 30 or a wireless LAN switch 31 in a wireless LAN communication spot monitors received radio wave intensity of a portable communication terminal 4 that establishes connection, and identifies a direction or a distance of the portable communication terminal 4, so that processing of narrowing down communication terminal identification information of the portable communication terminal 4 and accuracy is improved.

Figure 13:
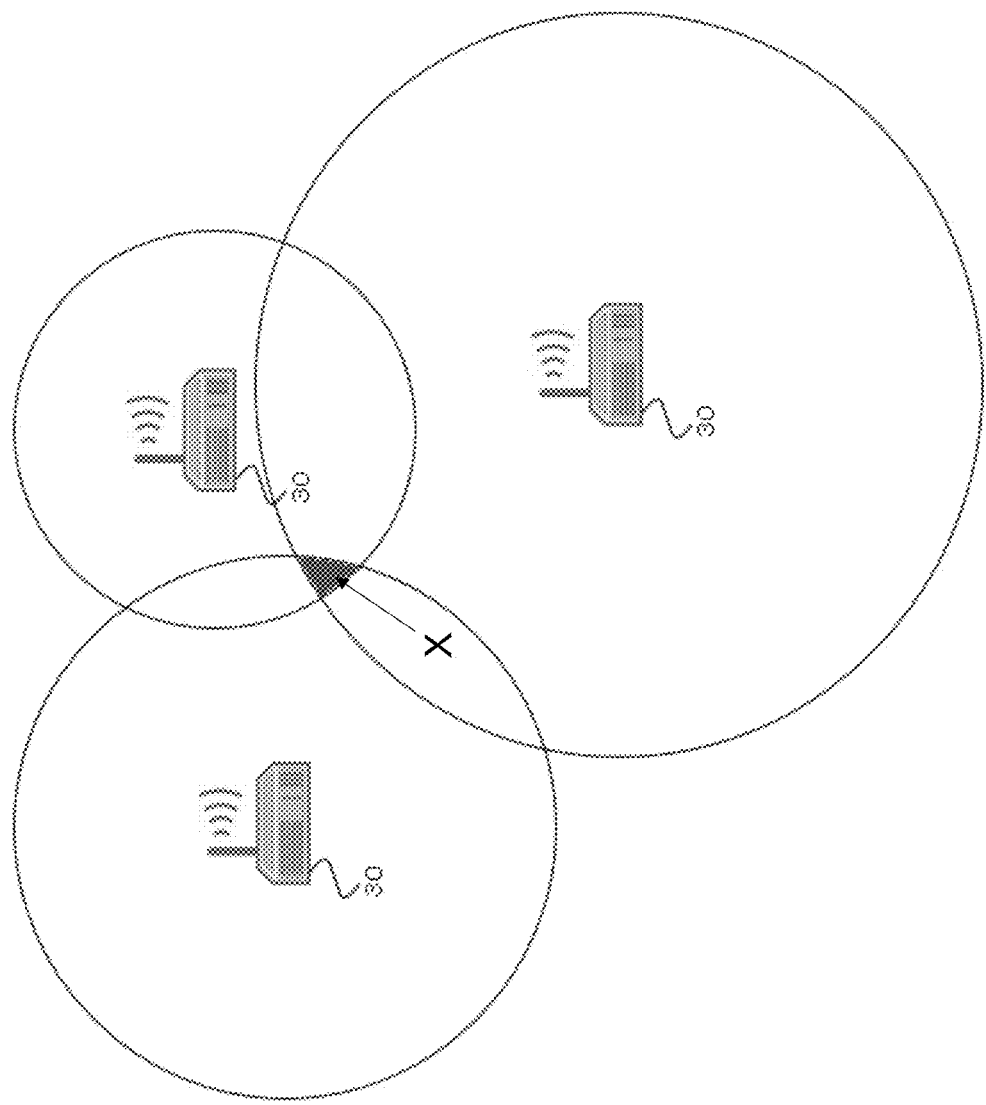
FIG. 13 is a diagram schematically illustrating a concept of processing for identifying a direction and a distance by received radio wave intensity in a sixth embodiment.

That is, the access point 30 or the wireless LAN switch 31 monitors the received radio wave intensity of the portable communication terminal 4 that establishes connection. Then, the access point 30 or the wireless LAN switch 31 identifies a direction and a distance of the portable communication terminal 4 from the received radio wave intensity. To identify the direction and the distance of the portable communication terminal 4 from the received radio wave intensity, the direction and the distance can be identified from overlap of circles (communicative ranges) made of the received radio wave intensity among the access points 30 in a specific MAC address. This is schematically illustrated in FIG. 13. In FIG. 13, a spot "X" is an overlap range, and thus existence of the portable communication terminal 4 in that position can be identified.

As illustrated in FIG. 13, assume that three access points 30 exist in a certain wireless LAN communication spot. Then, the access points 30 monitor the received radio wave intensity from the portable communication terminal 4, and thus in which range the portable communication terminal 4 exists is expressed in a circular manner according to the monitored radio wave intensity. In this case, if the received radio wave intensity is strong, the portable communication terminal 4 can be considered to be close to the access point 30, and thus a circle with a small radius is obtained. If the received radio wave intensity is weak, the portable communication terminal 4 can be considered to be far from the access point 30, and thus a circle with a large radius is obtained. Then, circles for the portable communication terminal 4 that includes specific communication terminal identification information are established in the respective access points 30. A position where the circles overlap with one another is the position where the portable communication terminal 4 exists. As a result, the direction and the distance of the portable communication terminal 4 can be identified from the received radio wave intensity.

The personal recognition processing of the above embodiments is executed for the identified direction and distance, based on the image information of the capturing device 32, so that a person appearing in the position can be narrowed down.

The above processing in the present embodiment can identify the direction and the distance of the portable communication terminal 4 by replacing the communicative range with virtual coordinates and executing the calculation processing. However, other methods may be employed.

Seventh Embodiment

A modification of the first to six embodiments will be described. In the first to six embodiments, the communication terminal identification information storage unit 24 stores the candidate communication terminal identification information for each person, and the communication terminal identification information comparison processing unit 25 compares the stored candidate communication terminal identification information and the communication terminal identification information newly acquired from the wireless LAN switch 31 or the like, and stores overlapping communication terminal identification information as new candidate communication terminal identification information. In the present embodiment, a case in which a communication terminal identification information storage unit 24 further stores a counter (reliability information) that indicates reliability of each piece of communication terminal identification information in association with candidate communication terminal identification information will be described.

That is, in comparison between the candidate communication terminal identification information and the acquired communication terminal identification information, the communication terminal identification information comparison processing unit 25 identifies the new candidate communication terminal identification information by calculating a union set, and counts up the reliability information (for example, +1) regarding the communication terminal identification information that is a product set (overlap), instead of storing the overlapping communication terminal identification information as the new candidate.

This processing will be described using comparison (S190 to S200 of FIG. 3) of communication terminal identification information of a user "a" in the first embodiment as an example. Note that processing other than the processing of comparing the candidate communication terminal identification information in the communication terminal identification information comparison processing unit 25 is nearly similar, and thus description is omitted.

In the first embodiment, users "a", "b", "c", and "d" are recognized, and a communication terminal identification information acquisition processing unit 23 has acquired "12-34-56-78-90-12", "34-56-78-90-12-34", "56-78-90-12-34-56", and "78-90-12-34-56-78" as MAC addresses of portable communication terminals 4. Since all of respective storage areas of the users "a", "b", "c", and "d" in the communication terminal identification information storage unit 24 are empty (S180), the acquired MAC addresses are stored as candidate MAC addresses of the users "a" to "d" (S190). At this time, the reliability information of the MAC addresses is set to an initial value, for example, "0". An example of the communication terminal identification information storage unit 24 in this state is schematically illustrated in FIG. 14. Note that, in the description of the present embodiment, the user "a" will be described, and thus only the storage area of the user "a" in the communication terminal identification information storage unit 24 is illustrated.

Next, after a lapse of a certain time, when users "a", "b", "e", and "f" are recognized, the communication terminal identification information acquisition processing unit 23 has acquired "12-34-56-78-90-12", "34-56-78-90-12-34", "90-12-34-56-78-90", and "12-AB-34-CD-56-EF" as MAC addresses of portable communication terminals 4. Since both of storage areas of the users "e", and "f" in the communication terminal identification information storage unit 24 are empty, the reliability information is set to the initial value "0" and the acquired MAC addresses are stored as candidate MAC addresses (S190).

Meanwhile, as for the users "a" and "b", the candidate MAC addresses in the communication terminal identification information storage unit 24 have already been stored. Therefore, the communication terminal identification information comparison processing unit 25 compares the candidate MAC addresses information stored in FIG. 14 and the newly acquired MAC addresses (S200), and obtains a union set. That is, as for the user "a", the newly acquired MAC address is added as a candidate, in addition to the candidate MAC address stored in FIG. 14. Further, the communication terminal identification information comparison processing unit 25 obtains a product set of the candidate MAC addresses information stored in FIG. 14 and the newly acquired MAC addresses, and counts up the reliability information of the overlapping MAC addresses "12-34-56-78-90-12" and "34-56-78-90-12-34" to update to "1". This is schematically illustrated in FIG. 15.

Further, after a lapse of a certain time, when users "a", "e", "f", and "g" are recognized, the communication terminal identification information acquisition processing unit 23 has acquired "12-34-56-78-90-12", "90-12-34-56-78-90", "12-AB-34-CD-56-EF", and "34-GH-56-IJ-78-KL" as MAC addresses of portable communication terminals 4. Since a storage area of the user "g" in the communication terminal identification information storage unit 24 is empty, the reliability information is set to the initial value "0" and the acquired MAC address is stored as the candidate MAC address (S190).

Meanwhile, as for the users "a", "e" and "f", the candidate MAC addresses in the communication terminal identification information storage unit 24 have already been stored. Therefore, the communication terminal identification information comparison processing unit 25 compares the candidate MAC addresses information stored in FIG. 14 and the newly acquired MAC addresses (S200), and obtains a union set. That is, as for the user "a", the newly acquired MAC address is added as a candidate, in addition to the candidate MAC address stored in FIG. 15. Further, the communication terminal identification information comparison processing unit 25 obtains a product set of the candidate MAC addresses information stored in FIG. 14 and the newly acquired MAC address, and counts up the reliability information of the overlapping MAC address "12-34-56-78-90-12" to update to "2". Further, the communication terminal identification information comparison processing unit 25 counts up the reliability information of the overlapping MAC addresses "90-12-34-56-78-90" and "12-AB-34-CD-56-EF" to update to "1". This is schematically illustrated in FIG. 16.

The above processing is executed until a termination condition is satisfied. In this case, the termination condition is satisfied when a person recognition processing unit 21 becomes unable to recognize the user "a", an output processing unit 26 outputs a MAC address having the highest reliability information at the point of time, as the MAC address of the portable communication terminal 4 used by the user "a". Note that the output processing unit 26 may output the MAC addresses with a predetermined value or more, for example, "1" or more, or all of the MAC addresses together with the reliability information, instead of outputting the MAC address with the highest reliability information.

In the above description, as a result of the comparison processing, and as a result of the calculation of the product set, the reliability information of the overlapping address has been counted up. However, as a result of the calculation of the product set, the reliability information of non-overlapping MAC address may be counted down (for example, −1). Further, count up and count down may be combined.

By executing the above processing, the MAC address having relatively high reliability information can be output as a candidate MAC address with higher reliability.

Further, as another embodiment of the present embodiment, the reliability information may be updated by making the count-up value larger than usual, in a case where narrowing-down of the MAC addresses is performed from a specific direction or distance, like the sixth embodiment.

Further, in a case where movement (roaming) of the portable communication terminal 4 from a certain wireless LAN communication spot to another wireless LAN communication spot can be detected, the reliability of the MAC address of the portable communication terminal 4 roamed within a certain time from when a person is recognized in the person recognition processing unit 21 may be made larger than a usual count-up value. Accordingly, accuracy of narrowing-down can be increased.

Further, the reliability of the MAC address of the portable communication terminal 4 roamed from the wireless LAN communication spot within a certain time from when a person becomes unable to be detected in the person recognition processing unit 21 may be made larger than the normal count-up value.

Further, according to the present embodiment, the union set of the candidate MAC address and the acquired MAC address is obtained, and the new candidate MAC address is stored, and thus the number of the candidate MAC addresses may be increased. Therefore, a MAC address that is a candidate having relatively low reliability information may be deleted from the storage area of the communication terminal identification information of the user. That is, MAC addresses having the reliability information that is a certain threshold or less (or the reliability information that is less than the certain threshold), or MAC addresses in lower orders than predetermined order when the MAC addresses are sorted out in descending order of the value of the reliability information may be deleted.

Further, a communication terminal identification information identifying processing system 1 is installed and tuned by a test, whereby the accuracy of the reliability information can be improved.

INDUSTRIAL APPLICABILITY

According to the present invention, the communication terminal identification information can be identified when communication through the wireless LAN in the wireless LAN communication spot is being performed. Accordingly, for example, when a person who is registered in advance as a person at a high risk for criminal wrongdoing is performing communication through the wireless LAN in the wireless LAN communication spot, the communication can be identified. Therefore, intervention in the communication through the wireless LAN communication spot, such as interruption or interception of the communication, distribution of false information, and stop of activation of a detonator of explosives through the network, becomes possible, and the invention can be used for prevention of the criminal wrongdoing.

Further, although the communication terminal identification information can be falsified, usually, the falsification requires a certain operation, and when the person goes out, the person usually uses the same "falsified" communication terminal identification information at least for the day. Therefore, even if the communication terminal identification information is falsified, intervention in the communication can be made by use of the present invention.

REFERENCE SIGNS LIST

1 Communication terminal identification information identifying processing system
2 Management computer
4 Portable communication terminal
20 Image information acquisition processing unit
21 Person recognition processing unit
22 Recognition information storage unit
23 Communication terminal identification information acquisition processing unit
24 Communication terminal identification information storage unit
25 Communication terminal identification information comparison processing unit
26 Output processing unit
27 Recognition notification reception processing unit
30 Access point
31 Wireless LAN switch
32 Capturing device
70 Calculation device
71 Storage device
72 Display device
73 Input device
74 Communication device

The invention claimed is:

1. A communication terminal identification information identifying processing system for identifying communication terminal identification information of a user who performs communication with a portable communication terminal using a wireless communication device, the communication terminal identification information identifying processing system comprising:
   a person recognition processing unit configured to perform recognition processing as to whether a person appears, based on image information obtained by capturing a wireless LAN communication spot where the wireless communication device exists by a capturing device wherein the person recognition processing unit determines whether the person is a person having appeared in the past by comparing the image information with information of persons recognized in the past;
   a communication terminal identification information acquisition processing unit configured to acquire communication terminal identification information of the portable communication terminal that performs communication using the wireless communication device;
   a communication terminal identification information storage unit configured to store, for each person, candidate communication terminal identification information of the portable communication terminal used by the person;
   a communication terminal identification information comparison processing unit configured to compare the candidate communication terminal identification information of the portable communication terminal stored in the communication terminal identification information storage unit, of the person recognized in the person recognition processing unit, and
   the communication terminal identification information acquired in the communication terminal identification information acquisition processing unit, and generate new candidate communication terminal identification information;
   an output processing unit configured to output a part or all of the candidate communication terminal identification information stored in the communication terminal identification information storage unit as the communication terminal identification information used by the recognized person; and
   a management computer configured to manage access to communication between the portable communication terminal used by the person and the wireless LAN communication spot where the portable communication terminal exists based on the output of the output processing unit prior to input of user identifying information by the portable communication terminal, wherein the output of the output processing unit is based at least in part on an image recognition data, the image recognition data comprising at least image information of a face portion of the person captured by the capturing device, and wherein the image recognition data is utilized by the person recognition processing unit to perform the recognition processing as to whether the person appears.

2. The communication terminal identification information identifying processing system according to claim 1, wherein
   the wireless communication device monitors received radio wave intensity in the communication with the portable communication terminal,
   a plurality of the wireless communication devices is installed in the wireless LAN communication spot, and
   a direction and/or a distance of the portable communication terminal is identified by an overlap of existing ranges of the portable communication terminal, the existing ranges being formed based on the received radio wave intensity of the wireless communication devices.

3. The communication terminal identification information identifying processing system according to claim 1 or 2, wherein
   the communication terminal identification information storage unit stores reliability information that indicates reliability in association with the candidate communication terminal identification information,
   the communication terminal identification information comparison processing unit sets a union set of the candidate communication terminal identification information of the portable communication terminal stored in the communication terminal identification information storage unit and the communication terminal identification information acquired in the communication terminal identification information acquisition processing unit to new candidate communication terminal identification information, and changes the reliability information of the communication terminal identification information included in and/or not included in a product set, at the comparison, and the output processing unit identifies the communication terminal identification information to be output, based on the reliability information.

4. The communication terminal identification information identifying processing system according to claim 3, wherein the communication terminal identification information comparison processing unit changes the reliability information using the direction and/or the distance of the portable communication terminal identified in the wireless communication device.

5. The communication terminal identification information identifying processing system of claim 1 wherein the management computer comprises a plurality of computers.

6. The communication terminal identification information identifying processing system of claim 1 wherein the input of user identifying information comprises a user ID.

7. A communication terminal identification information identifying processing program stored on a memory, for causing a computer used in a communication terminal identification information identifying processing system for identifying communication terminal identification information of a user who performs communication with a portable communication terminal using a wireless communication device to function as:
- a person recognition processing unit configured to perform recognition processing as to whether a person appears, based on image information obtained by capturing a wireless LAN communication spot where the wireless communication device exists by a capturing device wherein the person recognition processing unit determines whether the person is a person having appeared in the past by comparing the image information with information of persons recognized in the past;
- a communication terminal identification information acquisition processing unit configured to acquire communication terminal identification information of the portable communication terminal that performs communication using the wireless communication device;
- a communication terminal identification information comparison processing unit configured to compare, for each person recognized in the person recognition processing unit, candidate communication terminal identification information of the portable communication terminal of the person recognized in the person recognition processing unit, the candidate communication terminal identification information being stored in a communication terminal identification information storage unit that stores the candidate communication terminal identification information of the portable communication terminal used by the person, and the communication terminal identification information acquired in the communication terminal identification information acquisition processing unit, and generate new candidate communication terminal identification information;
- an output processing unit configured to output a part or all of the candidate communication terminal identification information stored in the communication terminal identification information storage unit as the communication terminal identification information used by the recognized person; and
- a management unit configured to manage access to communication between the portable communication terminal used by the person and the wireless LAN communication spot where the portable communication terminal exists based on the output of the output processing unit prior to input of user identifying information by the portable communication terminal, wherein the output of the output processing unit is based at least in part on an image recognition data, the image recognition data comprising at least image information of a face portion of the person captured by the capturing device, and wherein the image recognition data is utilized by the person recognition processing unit to perform the recognition processing as to whether the person appears.

* * * * *